United States Patent [19]

Dodd et al.

[11] Patent Number: 4,536,836
[45] Date of Patent: Aug. 20, 1985

[54] DETECTION OF SEQUENTIAL DATA STREAM

[75] Inventors: P. David Dodd; Ronald L. Blickenstaff, both of Boulder, Colo.; Richard L. Coulson, Stanford, Calif.; Robert J. Moreno, Boulder; Brian E. Trede, Lafayette, both of Colo.

[73] Assignee: Storage Technology Corporation, Louisville, Colo.

[21] Appl. No.: 441,901

[22] Filed: Nov. 15, 1982

Related U.S. Application Data

[63] Continuation-in-part of Ser. No. 325,350, Nov. 27, 1981, Pat. No. 4,468,730.

[51] Int. Cl.³ ............................................. G06F 9/00
[52] U.S. Cl. ...................................................... 364/200
[58] Field of Search ................................ 364/200, 900

[56] References Cited

U.S. PATENT DOCUMENTS

| | | | |
|---|---|---|---|
| 4,157,587 | 6/1979 | Joyce et al. | 364/200 |
| 4,370,710 | 1/1983 | Koft | 364/200 |
| 4,371,927 | 2/1983 | Wilhite et al. | 364/200 |
| 4,429,363 | 1/1984 | Duke | 364/200 |

OTHER PUBLICATIONS

B. T. Bennett et al., "Improving Performance of Buffered DASD To Which Some References are Sequential", IBM Technical Disclosure Bulletin, vol. 24, No. 3, Aug., 1981.

Primary Examiner—Jerry Smith
Assistant Examiner—Michael R. Fleming
Attorney, Agent, or Firm—Woodcock Washburn Kurtz Mackiewicz & Norris

[57] ABSTRACT

A method for detection of a sequential data stream which can be performed in a data storge subsystem without host computer intervention is disclosed featuring examination of the channel program processed during a read operation for signals indicative that the data is not part of a sequential data stream, for example, embedded seek instructions. If a particular channel program for does not contain such indications, the successive record or records may then be staged to a faster access memory device such as a solid-state cache. The invention is described in a plug-compatible, software-transparent configuration.

11 Claims, 10 Drawing Figures

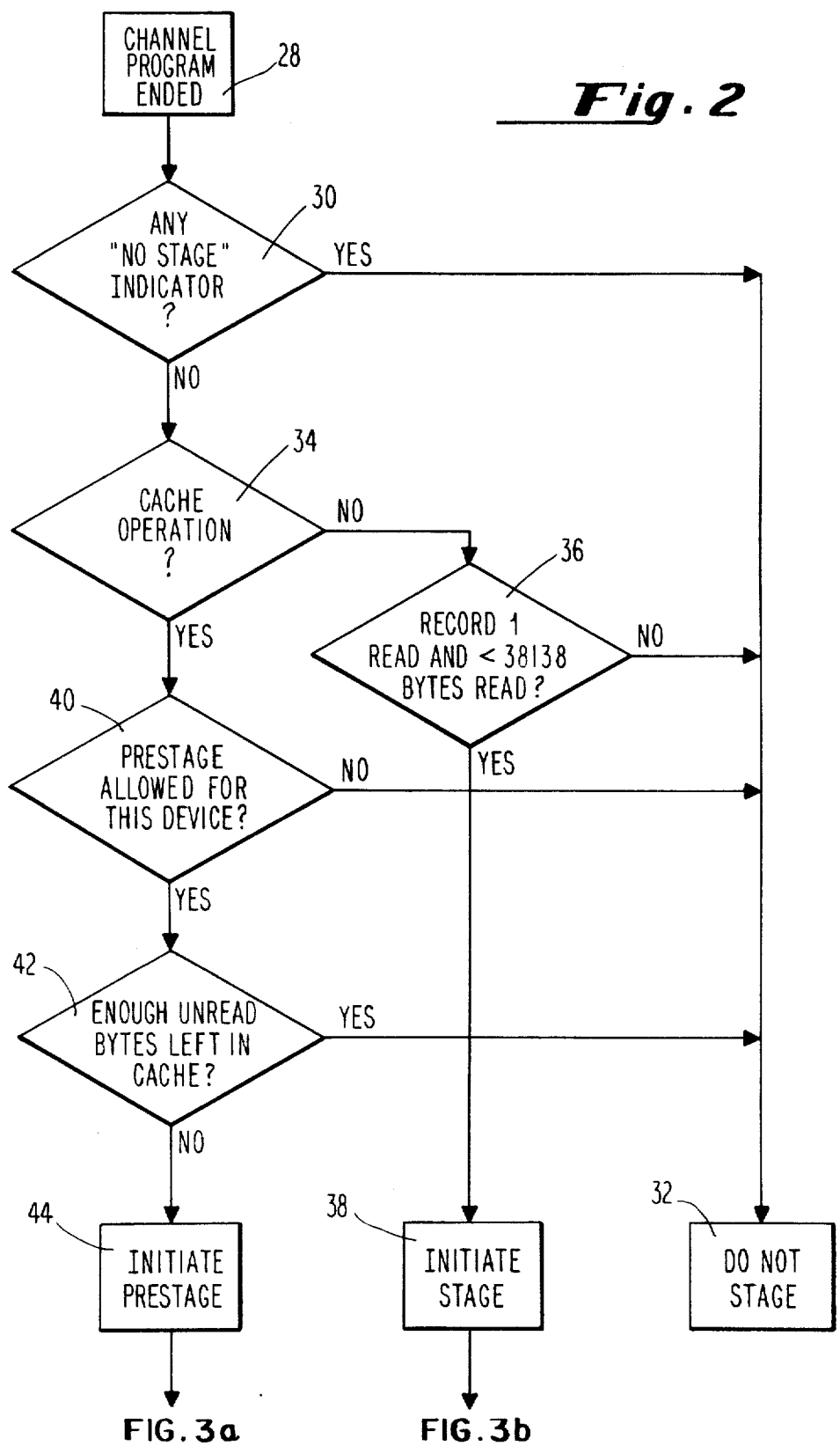

DETECTION OF SEQUENTIAL DATA STREAM

CROSS-REFERENCE TO RELATED APPLICATIONS

This application is a continuation-in-part of copending Ser. No. 325,350, filed Nov. 27, 1981 and now U.S. Pat. No. 4,468,730.

FIELD OF THE INVENTION

This invention relates to the field of data storage and management. More particularly, the invention relates to a method for detecting whether a particular data set having been requested from long term storage by a host computer is likely to be part of a sequence of such sets, and for taking appropriate action in response to this determination.

BACKGROUND OF THE INVENTION

Modern data processing systems typically comprise a host computer, consisting of an arithmetic and logic unit and a main memory unit for containment of data and instructions presenting being processed, and long-term storage means for storage of data and processing instructions at other times. In systems using the IBM Corporation's equipment, the long-term storage means is connected to the host computer by means of a "channel." When the host desires a particular data set or record, it issues a command over the channel to the long-term storage means, which then locates and reads the data from whatever medium it is stored upon, e.g., magnetic disks or tape memory media, over the channel into the main memory of the host. The substantial length of time required to retrieve data from long term storage limits the throughput or usage of the host computer. In particular, location of the beginning of the data set, e.g., physical juxtaposition of the location of the beginning of a record stored on disk to the read/write head, is time consuming. The actual reading of the data proceeds comparatively quickly. To minimize this loss of use of the host computer, the host will typically issue a series of requests for data and then perform other tasks while the data is being retrieved from long term disk or tape memory. However, even when this "queueing" is performed there is substantial host computer computation time lost due to the time required for accessing data and software overhead associated with the queueing process. This has remained an unsolved problem in the art and it is an object of the present invention to improve host computer throughput by reducing queueing times.

It has been proposed in the prior art that such queueing times be reduced by "staging" data physically stored surrounding all data which is the object of a SEEK command issued by a host, from a disk memory into a solid-state memory of much faster access speed. The solid-state memory is located external to the host, outboard of the channel from the host. Thus, when the host issues subsequent READ commands, the data sought may already be contained in the high speed solid-state memory and can be supplied to the host more or less instantaneously. However, if all data sets surrounding records accessed by the host are read into a solid-state memory external to the host as described above, the problem of queueing is not entirely eliminated, as then the channel and director usage time consumed while data is read into cache memory is added to the actual latency time required for the data set to be located on the disk and juxtaposed to the head.

Moreover, it will be appreciated that there are generally two ways in which data is accessed by a host computer. All the data in a given data set may be called for by the host at a given time, or the host may initiate a separate call for each portion of the data set as required. In the first case, addition of the cache memory to the system adds no performance improvement, as but a single latency time is required to satisfy each input/output request. In the second case, wherein each individual host instruction is part of a sequence of instructions typically directed to access successive portions of a physical record such as a tape or disk drive, latency time is consumed in responding to each portion of the data set. In this situation, the total latency time can be reduced to that of a single access operation if successive portions of the data set are read into a high speed solid-state cache. Subsequent requests for other portions of the data set can then be satisfied directly from solid-state memory without involving second and successive physical access operations. That is, if the data is cached in anticipation of a subsequent SEEK command, it will be available immediately. Accordingly, it is desirable that means be provided for determining which data requests made by a host computer are likely to be part of a sequence of such requests.

It would not, of course, be impossible for the host computer to issue a single indicating whether or not a particular data set called for is part of a sequence of such sets, and some systems now being announced will have this feature. This would, of course, simplify the decision as to whether or not to "stage" the subsequent record from the long-term data storage means into a cache memory. However, many existing computing systems of commercial importance (such as most of the IBM Corporation's line of computers) do not provide such a signal. Nor is it desirable to modify these computers, in particular their operating systems, in order to provide such a signal as such modifications are difficult to implement correctly and are not popular with computer users.

Accordingly, it is desirable to render the caching of data function more efficient by using improved means and methods to determine whether a particular data request made by a host computer is part of a sequence of requests directed to the same data set (in which event the subsequent portion of the data set would be cached) while data which is not amenable to efficient caching is processed in the same manner as in the prior art.

It is a further object of the invention to provide a system in which sequential portions of a data set can be cached so as to improve thoughput of a host computer system, without requiring modification to the host.

Yet another object of the invention is to provide a means and method for detecting whether or not a data record sought is part of a sequence of such records, wherein the means and method operates using information contained within the "channel program" processed by the storage detector, whereby implementation of the method of the invention is rendeted simple and relatively inexpensive.

A further object of the invention is to provide a method whereby an area in the cache assigned to a particular data set can be deallocated therefrom automatically so as to free storage space for reuse.

SUMMARY OF THE INVENTION

The present invention satisfies the needs of the art and objects of the invention as noted above by examining each data record that is read from long-term data storage means to a host computer. Control signals contained in the (conventional) channel program are used to provide negative indicators, i.e., signs that the record sought is not one of a sequence of records stored together on long-term storage means. If none of these indicators is found during the retrieval of a given record from long-term storage to a host computer, succeeding records are then cached. Upon the receipt of each successive "read" request from the host computer, the request is compared with a directory which keeps track of which records have been cached so that the host's request will be satisfied from the cache if possible. In a particularly preferred embodiment, if a first record on a given disk track is read from the disk storage device into the host and no indicator that the first record is not part of a sequence of records on the given track is detected, then the data on the given track is cached. If the data on the rest of this track is then called for by the host computer, the track next succeeding the given track is then cached, again without host intervention, and so on. A track may also be "prestaged" if, for example, there are not enough unread bytes in the cache to satisfy a subsequent data request equal in size to that most recently satisfied.

In a further preferred embodiment, at the time of installation of the computer system or at a later date, certain disk packs, i.e. physical assemblies of magnetic storage disks, may be expected to contain substantially random data sets, while others may be expected to store mainly sequential data sets. Upon a host's request for data stored on one of these disk packs, differing control sequences may be undergone to determine whether caching of further data would be desirable. For example, if the access request is to a disk pack considered to be substantially random, a comparatively lesser amount of data may be staged to the cache which is useful if the request turns out to be one of a sequence. If the request is to a disk pack considered to contain mainly sequential records, a substantially larger amount of data can be cached in response to the determination that caching would desirable.

BRIEF DESCRIPTION OF THE DRAWINGS

The invention will be better understood if reference is made to the accompanying drawings, in which:

FIGS. 2-5, 8 and 9 represent flowcharts of the decision-making process according to the invention.

DESCRIPTION OF THE PREFERRED EMBODIMENTS

The method of detection of a sequential data stream of the invention was designed in particular to operate within the cachhe memory buffered subsystem which is the subject of copending application Ser. No. 325,346 filed Nov. 27, 1981. The chief objective of the cache memory buffered subsystem which is the subject of the copending application referred to above and of which the present invention forms a part is to save on latency time required to complete a SEEK instruction given by the host computer by reading data into a faster access, typically solid-state memory, from a slower access, long-term magnetic storage device, in advance of the host actually calling for the data. In this way, if the cached record is then called for, a physical delay need not be undergone. Clearly, it is desirable that only those records which, in fact, are portions of sequentially accessed sequences of records be staged to the solid-state memory or "cached." Otherwise, caching of data will have beneficial effects only when substantially all the records sought for are, in fact, sequential, e.g., on the order of 90%. This is not the case in typical commercial systems. Accordingly, it is required that some means be provided to detect which records are portions of sequences of records and to cache only those. The present invention provides means for making the determination.

As discussed above, in the preferred embodiment of the invention, some data may be staged even when it is not clearly determined that a given request is part of a sequence of requests; simulation testing shown that on a statistical basis, this will still provide a performance improvement.

Figure 1:
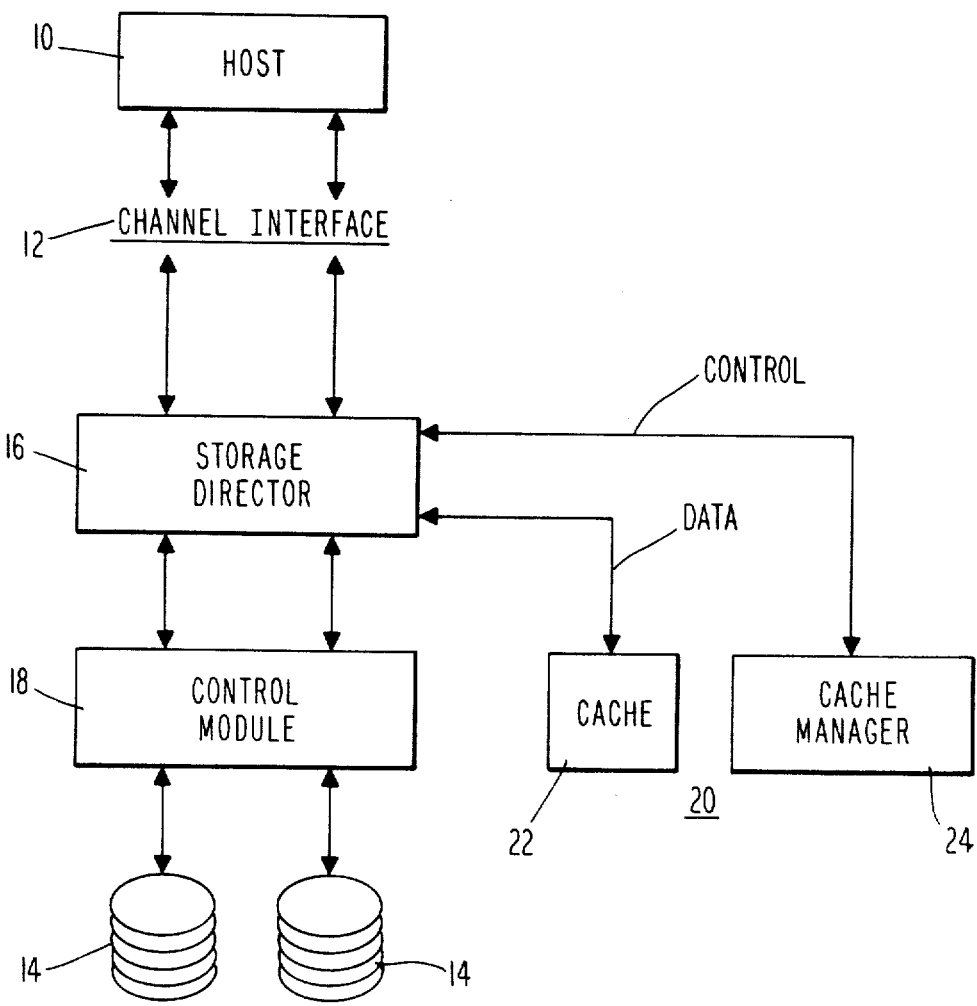
FIG. 1 represents a simplified view of the system within which the invention forms a part.

The invention is designed to operate in a cache buffered memory subsystem operating as an add-on to a pre-existing memory system which is plug-compatible with a host computer; in a preferred embodiment, with an IBM 370 Series machine operating under a typical IBM operating system. The board layout of the system of the copending application referred to above is shown in FIG. 1. There, the host computer 10 passes commands and data over and receives data from a channel interface indicated generally at 12. In the event that the data to be accessed is stored on a disk drive such as at 14, access commands are passed to a storage director 16 which converts it into a form suitable for controlling a control module 18 which actually controls the movement of the disk drives 14, e.g., the radial movement of read/write heads with respect to the disks and the like. The system as thus far described is conventional. What is added by the invention of the copending application referred to above is a cache memory subsystem indicated generally at 20 comprising a solid-state cache memory 22 and a cache manager 24 for determining which data is to be staged into the cache memory 22 from the disks 14. It is accordingly the cache manager 24 which carries out the method of the present invention, which will now be described in detail.

When the host computer 10 seeks to obtain data from a disk storage system 14, it issues a well defined SEEK command over the channel 12, which is acted upon by the storage director, in processing the so-called "channel program", to cause the control module 18 to access the data sought for. The data is then passed back through the control module 18 and the storage director 16 and over the channel interface 12 to the host 10. The actual reading and writing of data is performed under the channel program, including the SEEK command, defined by IBM, as is the channel interface itself, in a document entitled "I/O Interface Channel to Control Unit", IBM Publication GA22-6974-4. As will be appreciated by those skilled in the art, this well defined protocol permits the channel program to contain additional instructions for further data reading and writing. For example, if a given data set is stored at several different locations on disk, for example, on several different "cylinders", these being areas of data storage spaced at varying distances from the central axis of the disk stack, a CYLINDER SEEK command may be encountered during the channel program. The control module and storage director then cause the head to access the new cylinder sought for and to continue the reading operation. Similar instructions include HEAD SEEK commands. Thus, typically in the prior art the storage director will follow such additional "embedded" commands encountered in the channel program. Inasmuch as the system of the present invention is very desirably "software transparent" and "plug compatible" to the host, so that no modification of the host is required, it continues to obey these instructions. However, the cache manager comprises means for examining information received from the director in performance of the channel program, for determining whether additional data should be staged from the disk to the cache after completion of the actual operation ordered by the host. Specifically, the cache manager 24 examines the channel commands as they pass through the storage director for commands such as those above, e.g. CYLINDER SEEK, HEAD SEEK, and the like. If it receives no indications that the data is not of a sequential nature—these being defined more fully below—it then continues with the reading of all the data stored on a given track (i.e., an area of data storage on a single surface of a disk one full revolution long) into the cache. If the host then calls for the remainder of the track, the cache manager detects this and causes the next track to be similar staged to the cache without host intervention, and so on. In this connection, note that the "next track" may not be physically adjacent to the last on the same disk surface. Depending on the organization of the disk system, the "next track" may be on an entirely different disk surface, though usually one located above or below the last in a stack of disks, so as to save on both seek and latency delay times.

Accordingly, the cache manager examines the channel commands throughout the read channel program, while the actual decision as to whether the following track should be staged is made at completion of the request; that is, at the conclusion of the conventional "channel program." The present invention therefore relates to additional decision-making, carried out independent of the host, by the cache manager 24. Specifically, the storage director 16 reports to the cache manager 24 certain information or "statistics" which enable the cache manager 24 to make decisions concerning the desirability of staging successive tracks. In a presently preferred embodiment, these statistics may include:

1. Was the first record on the track among the records processed?

2. Was the last record on the track among the records processed?

3. Was the "End of File" record among the records processed?

4. Was the channel program processed against the cache or direct to the disk storage device?

5. Were cahce or disk read errors encountered?

6. Was an embedded head or cylinder seek command encountered in the channel program?

7. Did a write command occur during the channel program?

8. How many records were processed in the track during the channel program? and

9. How long were the records processed?

As discussed above there are two basic types of decisions relating to staging to be made following execution of the channel program. First, if the channel program was processed directly from the storage director to the disk drive, i.e., a non-cached record was read, the question as to whether the remainder of the track should be staged into the cache arises. The second question arises when the channel program was processed to the cache, that is, the data sought for by the channel program was indeed found in the cache. In this case, the question is whether it is desirable to "prestage" the entire next disk track into the cache. Of the above statistics, the following disqualify data from being cached, both as to stage and prestage: errors, write commands, or "End of File" records. These are all counterindicators of the desirability of caching, as they indicate that the next record on the disk track is not necessarily part of the same data set as that read, or that some part of the system is malfunctioning.

Embedded seek commands are also considered as part of the statistics, but they are treated somewhat differently depending on the embodiment of the invention. As discussed briefly above, in a presently preferred embodiment of the invention, certain individual disk drives may be determined to contain largely sequential data sets or largely random data sets. In either case, caching may be of some improvement. For example, in the random case, the host may not always call for all the data in a given data set at one time, so that it would still be desirable to do limited caching, in the case of a READ command directed to such a disk pack. Encountering a CYLINDER SEEK command during the processing of a channel program would counterindicate the desirability of caching because presumably even a sequential data set would not often extend across plural cylinders on a disk pack. However, a HEAD SEEK, indicating that the next record sought for by the channel program is in the same cylinder as that previously read, is not considered a counterindication of the desirability of caching even in the random data set.

HEAD SEEK and CYLINDER SEEK commands are treated differently when the disk pack is considered to be likely to contain sequential data. In the case of sequential data, both HEAD SEEKs and CYLINDER SEEKs counterindicate caching because there is no insurance that subsequent data sets may not be processed to the same cylinder. Essentially, in the case of a random disk pack, caching is performed without regard to sequentiality, so HEAD SEEKs do not preclude caching. The amount of data cached is kept deliberately small so as to minimize the impact of unnecessary caching which does not lead to a direct benefit.

FIG. 2 shows the decision-making process to be undergone at the completion of each read operation, i.e., upon completion of the channel program, at 28, with respect to a disk pack considered to contain mainly sequential data sets. The examination of the statistics kept by the director to determine whether any of the statistics disqualify the record from staging is performed first, as indicated at block 30 where the existence of any of the "no stage" indicators, items 3 and 5–7 of the statistics listed above, is determined. If there are such indicators the data is not staged as noted at 32. If there are no such indicators, the next question is whether the previous access was directly from the disk to the host or whether the operation was from the cache to the host, as indicated at decision block 34. If the operation was from disk to host (NO answer to block 34) the data is looked at to see whether the first record on the track was read, and that not more than 38,138 bytes (the maximum number of bytes stored on two tracks of a particular mode of disk drive) were read as shown at 36. If so, then at least the remainder of the track is staged, at 38. Under certain circumstances, as discussed below in connection with FIG. 3b, several more tracks are staged.

Returning to consideration of block 34, if the previous operation was from the cache to the host, indicating that a sequence of records has been correctly detected and cached, then the question is whether prestage of the next track is desirable. At decision block 40 the question is whether prestage is allowed for records stored on a particular disk device. This allows the system designer to prevent the data stored on certain disk devices from being cached, i.e., allows him to save certain disk for data he knows will be random. For example, so-called "fixed head disks" which typically have less latency time than movable head disk drives would ordinarily not be used for sequential data sets. If prestage is not allowed, then the decision is made simply not to stage. If prestage is permitted, the cache manager 24 (FIG. 1) then determines if prestage is desirable. For example, the decision might consider whether there were enough bytes remaining in read in the cache to satisfy a subsequent data request of the same size, as noted at 42. Similarly, the manager might look at the length of the record requested in a given request, and stage more than the remainder of the track, or more than a single following track, if it appears that one or more subsequent similar requests will not otherwise be satisfied by the data staged to the cache. If both conditions are satisfied, a prestage subroutine described in connection with FIG. 3a is entered, at 44.

Figure 3A:
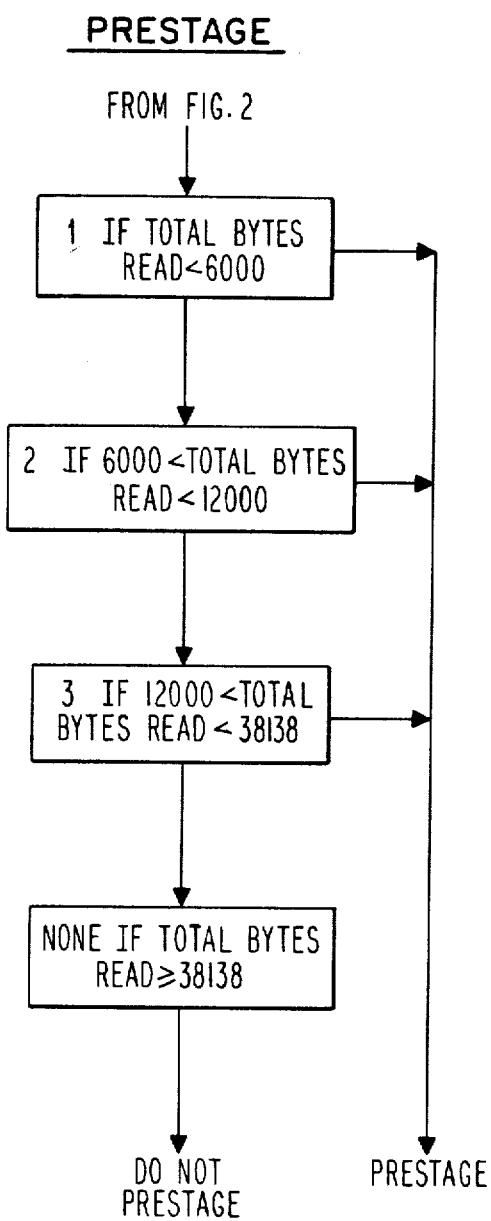
Figure 3B:
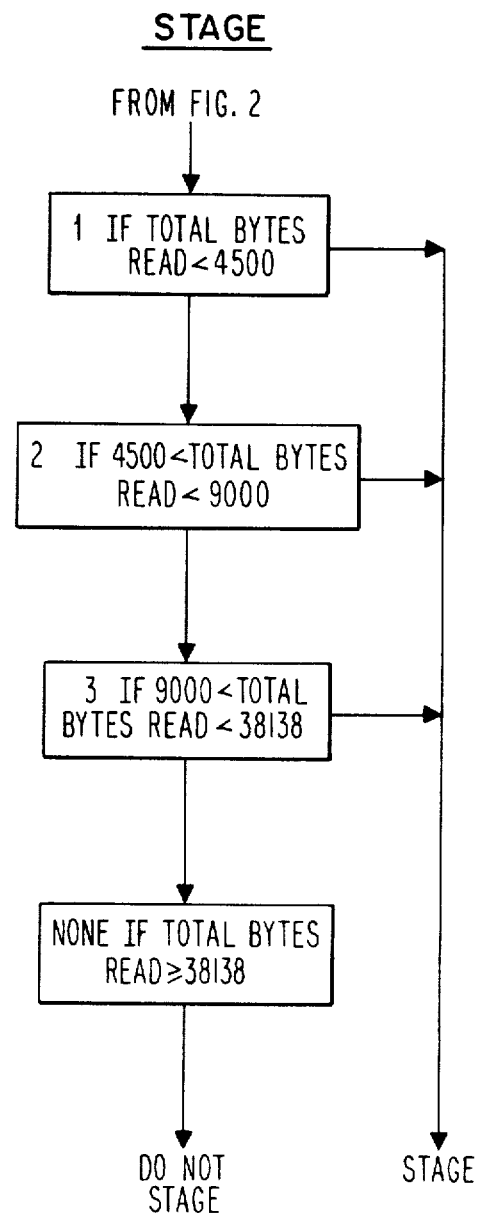

FIGS. 3a and 3b show how the number of tracks to be staged or pre-staged is determined. In both cases, the number of tracks to be staged or pre-staged is proportional to the number of bytes read in performance of the channel program. The assumption is made that the longer the request, the more likely it is that subsequent requests will also be long. Thus, in FIG. 3a if less than 6000 bytes are read, one track is prestaged, if between 6000 and 12,000 bytes were read two tracks are prestaged, while if the total number of bytes is between 12,000 and 38,138 three tracks are staged. (As noted above, the number "38,138" will be recognized by those skilled in the art as being the maximum number of bytes stored on two disk tracks on a popular family of disk drives.) Accordingly, if a single READ request totalling two tacks was performed, three tracks are prestaged to the cache, thus insuring that similar subsequent requests can be satisfied without incurring a latency time penalty. If the total number of bytes read in a particular operation is more than two tracks, i.e., more than 38,138 bytes, prestaging to the cache is not performed. This is so simply because satisfaction of a caching request of this length will consume considerable director and cache manager operation time which might be better expended elsewhere.

FIG. 3b shows the similar calculations for staging. One track is staged if the total bytes read in the execution of the channel program was under 4500; two if it was between 4500 and 9000, and three if it was between 9000 and 38,138.

Figure 4:
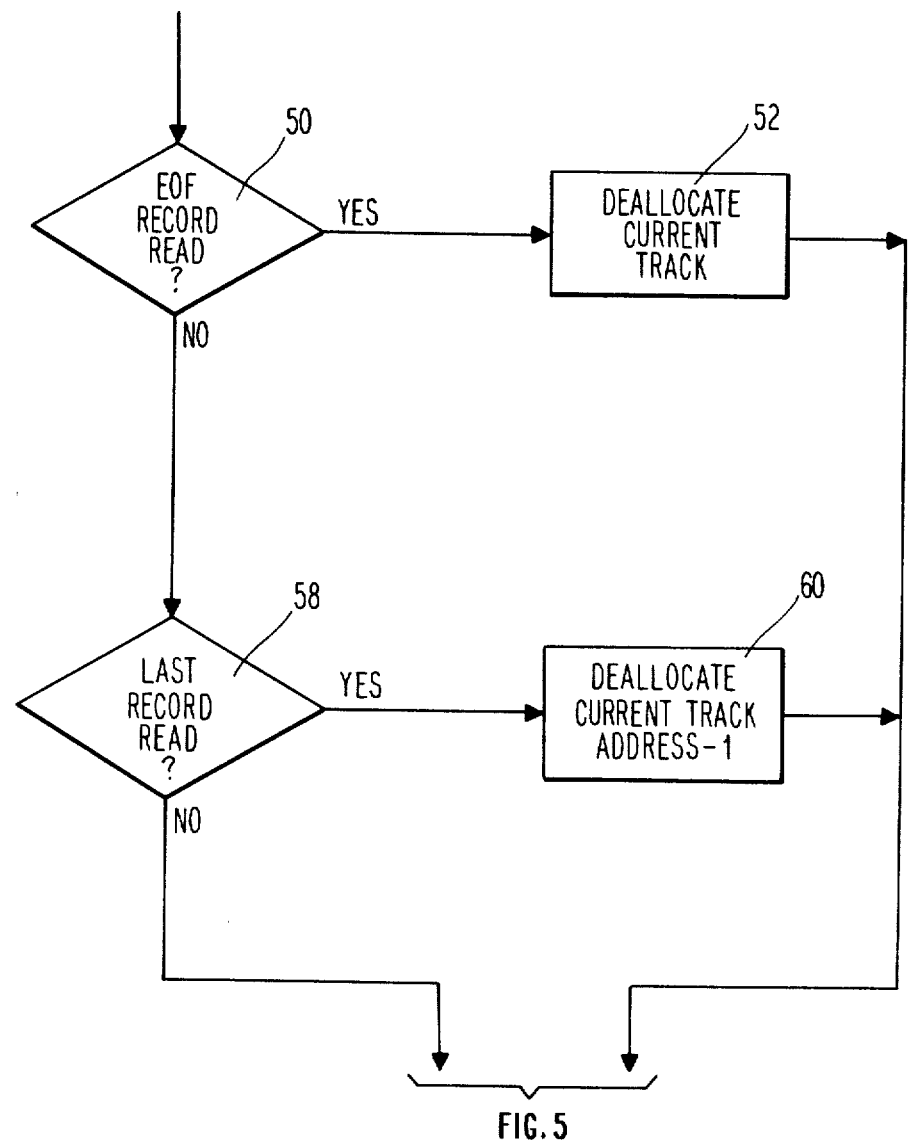
Figure 5:
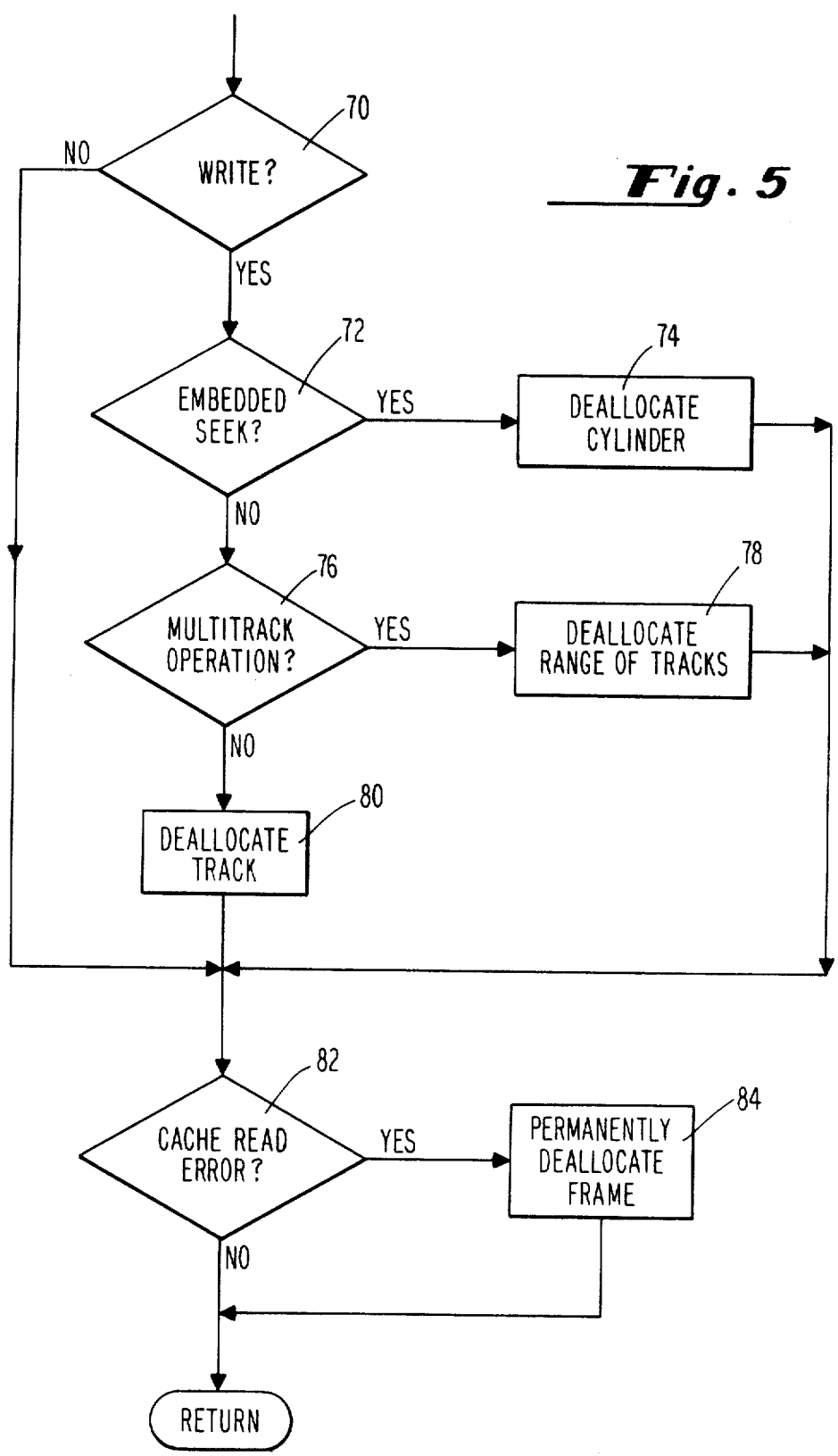

It will be appreciated that it is important to keep track of the use of each of the tracks of data stored in the cache so that when data need no longer be stored in the cache the "frame"—i.e., the area of cache memory—assigned to that data can be "deallocated" and returned to the pool of empty frames. Deallocation is performed in order to free storage space for storage of data (discussed in connection with FIG. 4) and to ensure data integrity (FIG. 5). FIG. 4 shows a flowchart of operations undergone in deallocation operations. It begins at 50 with the question, "EOF record read?" If the EOF (end of file) record, i.e., the last record in a given data file, has been read, clearly it will not be desirable to do any further staging, nor will there be any anticipated further use for the data. Accordingly, the frame assigned to that track is deallocated at 52. Likewise, if an indication is found at 58 that the last record of a track was read, there is no need to preserve data stored in the preceding frame, i.e., the frame containing the data from the current track address minus 1, so that it is deallocated as at 60.

Performance of the deallocation subroutine shown in FIG. 4 is followed by that shown in FIG. 5, which as noted above, controls deallocation for data integrity purposes. Thus, for example, if the host writes to a cached track at 70, clearly the cache area in which the data corresponding to the write operation is stored should be deallocated as no longer containing valid data. Decision blocks 72 through 80 indicate how much of the cache should be deallocated upon indication of a write operation. For example, if at 72 an embedded seek was encountered, the cylinder should be deallocated at 74. If a multitrack operation, i.e., one in which writing was performed to a sequence of tracks, occurred as at 76, that range of tracks is deallocated at 78. Otherwise, simply the single track to which the write occurred is deallocated at 80. If the channel program ran only a read operation, i.e., the decision in block 70 has a negative result, then one simply looks to see whether a cache read error was detected during the reading at 82. If so, the frame is permanently deallocated at 84, on the assumption that a defective memory element is contained therein or the like.

Figure 8:
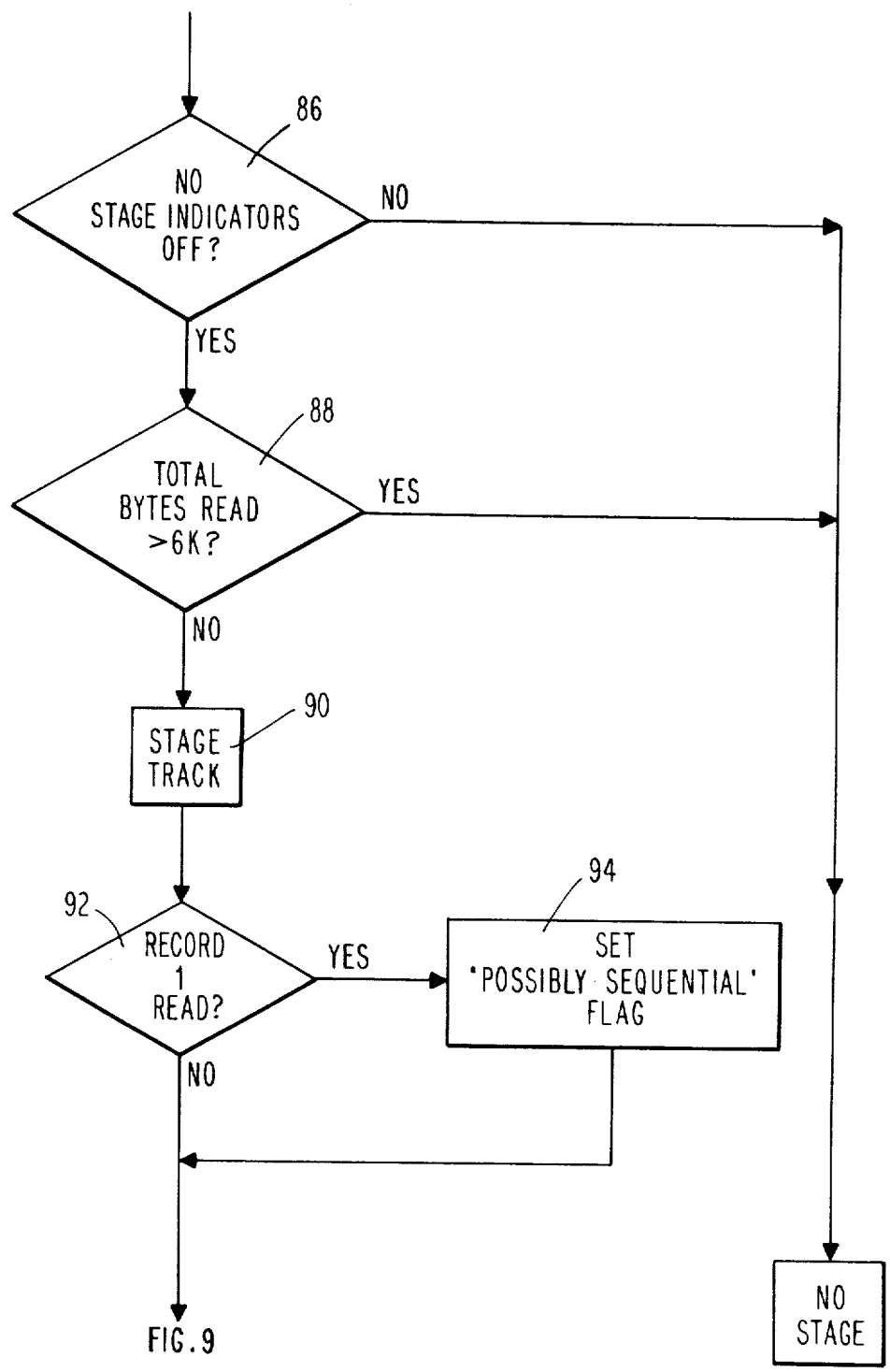
Figure 9:
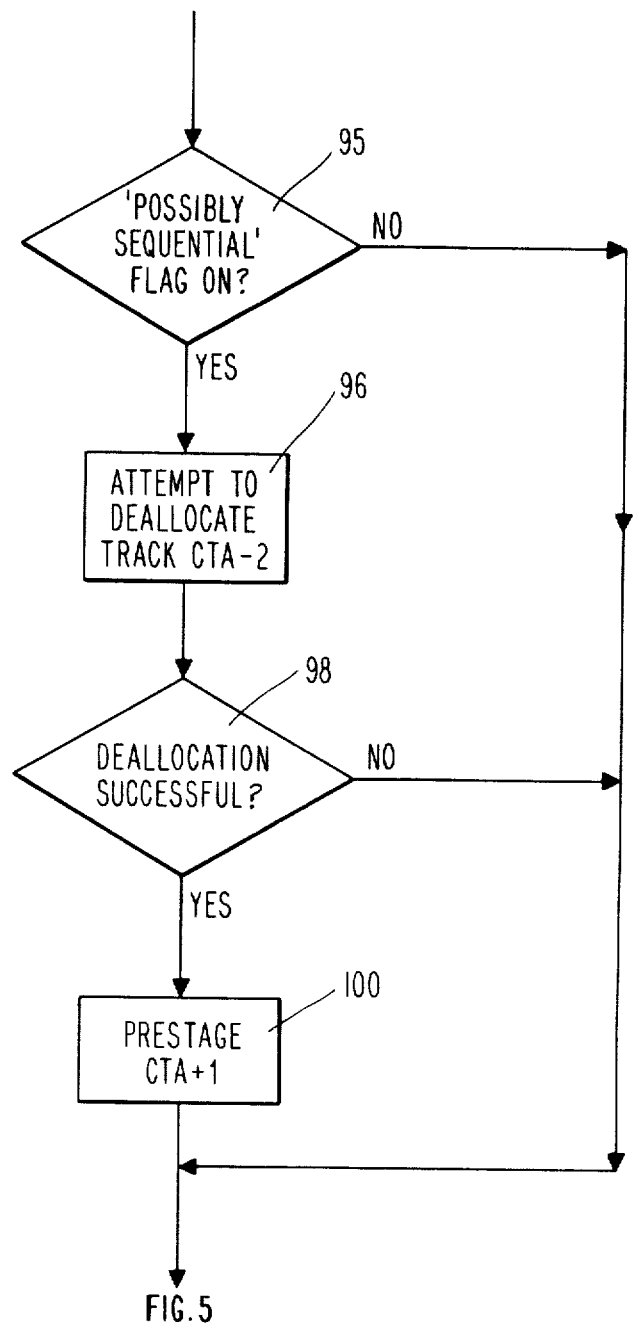

FIG. 8 shows the flowchart of the decision-making process undergoen in the presently preferred embodiment of the invention in which data stored on a disk pack anticipated to contain mainly random, but possibly some sequential data sets, is considered for caching. A fixed amount of data is cached in response to all read requests; the amount of data cached is determined by weighing savings in latency time realized thereby versus the director time consumed by staging data. At present the amount of data anticipated to be staged is one full track. Even if the data request turns out to have been actually random, this practice does not unduly burden the system with uselessly cached data, and may give a performance improvement. Computer modelling assuming a track size of 19k bytes and a total cache space of 12m bytes indicates that an improvement will exist. The module begins at 86 by considering whether any of the no stage indicators are on; if so, no staging is done. If the total bytes read is greater than 6,000, no staging is undergone, because data blocks of this size consume substantial director time in caching. The track is staged at 90. If record one of the track was also read, at 92, a "possibly sequential" flag is set at 94. If this flag is set, prestage determination is undergone next. This is shown in FIG. 9. An attempt at 96 is made to deallocate the track having the current track address minus two (CTA-2), i.e., the track two tracks preceding that presently being considered, in the conventional sequence of reading. If this is possible, at 98, which indicates that 3 tracks in a row have been read, then the following track address, track CTA+1, is prestaged at 100, again assuming that the sequence is likely to continue. Deallocation is performed with respect to data cached from a random disk pack in substantially similar fashion as discussed above in connection with sequential disk packs. Deallocation of the current track address−2 is performed at 96, as noted above, and the data integrity deallocation routine described in connection with FIG. 5 is undergone as well, in particular with respect to cache read errors.

It should be noted as well that the deallocation is performed with respect to random disk packs in accordance with allocation of frames to data to be staged, in accordance with co-pending application, Ser. No. 325,351 entitled "Adaptive Domain Partitioning of Cache Memory Space", now U.S. Pat. No. 4,430,712, and a co-pending continuation-in-part application Ser. No. 441,791, filed Nov. 15, 1982 and now U.S. Pat. No. 4,503,501 having the same title. In accordance with that invention, random data cached according to the methods discussed in connection with FIGS. 8 and 9 is eventually deallocated simply on the basis of not having been used.

The flowcharts of FIGS. 2–5 and 8–9 will be appreciated by those skilled in the art as ones designed to operate as subprograms within a cache manager control program. In particular, the methods of the invention as described above are designed to operate within the Model 8890 disk controller of Storage Technology Corporation, the assignee of the present invention. Accordingly, the decision-making sequences shown in FIGS. 2–5 are configured as subprograms undergone every time a channel program is executed. There are numerous other ways in which it would be possible to implement the method of the invention. For example, staging might be considered only where the record most recently read began a track and prestaging could only be considered at the end of a track. Those skilled in the art will recognize numerous other expedients are possible.

In a presently preferred embodiment, the decision-making capacity of the invention is embodied in microcode permanently written on a floppy disk physically carried within the storage director unit and copied to solid-state random-access memory each time the director is turned on. This is operatively connected to a preexisting storage director processor for performing the cache manager function.

Figure 6:
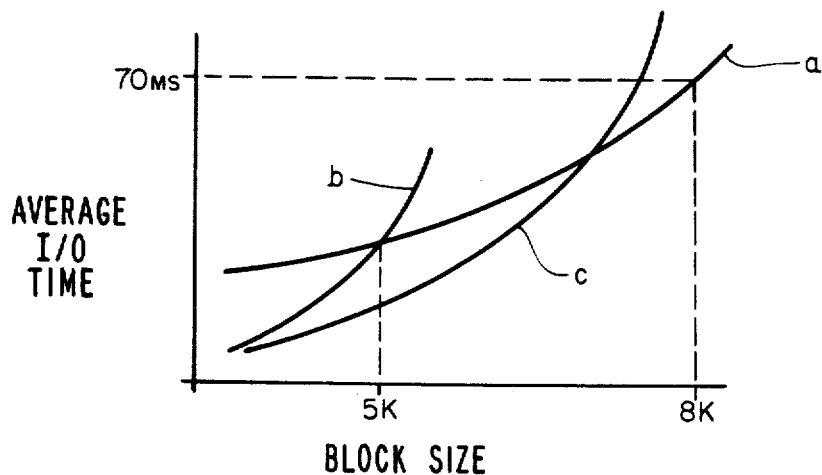
FIGS. 6 and 7 show graphically the performance improvements made by the invention.
Figure 7:
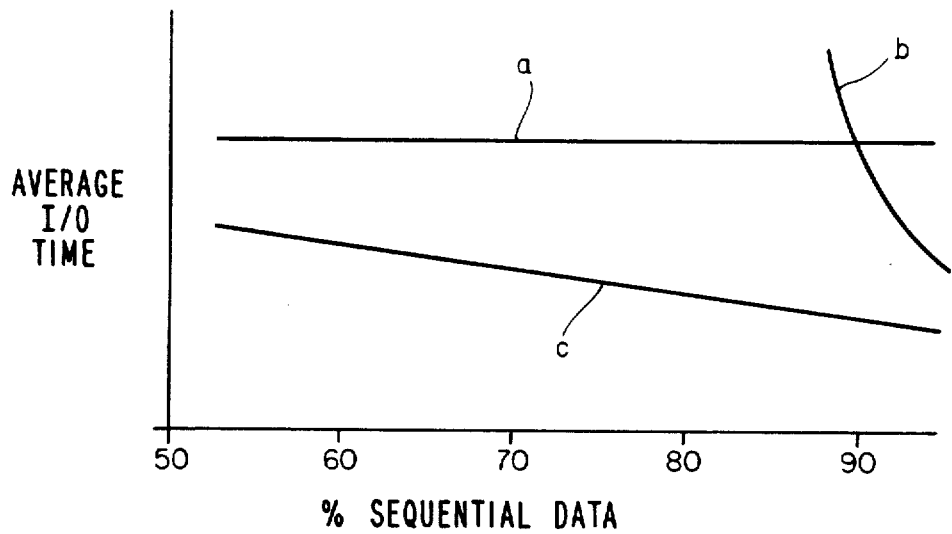

FIGS. 6 and 7 show graphically the performance improvements provided by the caching subsystem of the invention. These figures represent data generated by computer simulation of system performance. No comparable actual data is available as of the date of filing of the instant application though testing with respect to individual jobs indicates that a substantial performance advantage is realized. These results related to a preferred embodiment in which data is cached in units of disk tracks, which for modelling purposes, are conceptually defined to contain on the order of 4 records.

FIG. 6 shows average input/output command response time versus the block size of the data being accessed. "Input/output (I/O) time" includes the latency time required for a particular sector of a given disk to be juxtaposed to the read/write head and the time required for the read/write head to move radially with respect to the disk (in those disk drives where movable heads are used), in addition to "RPS miss time", time lost due to components of the I/O path not being available at the time the data is available. Seek and latency delays are independent of the block size. However, since the longer block requires more time to be written or read, input/output transfer time and RPS miss time both increase as the block size increases. Curve A of FIG. 6 shows this, graphically representing the average response time of a prior art system, i.e., one in which no cache is present. There the longer the block the longer the average response time. The minimum time reached is non-zero, as latency and access time is required even for a block of extremely short size.

Curve B of FIG. 6 shows the improvement made by caching a larger portion of data than that requested upon receipt of all input/output requests; that is, no distinction is drawn between those requests deemed likely to be sequential and those which are random. The input/output time with respect to smaller block sizes is improved, as the latency time is significantly reduced. However, the fact that data is cached even when non-sequential, i.e., in response to random requests, thus consuming additional time due to director unavailability, means that the average input/output time with respect to large blocks is greater than in a non-cached subsystem. Hence, curve B shows that the average input/output time is higher than for the non-cached device of Curve A as the block size increases.

Curve C of FIG. 6 shows the improvement made by the present invention where a distinction is effectively drawn between data which is deemed likely to be sequential and that which is not. Since randomly accessed data, i.e., data not identified as being sequential, is not cached, random data has the same input/output access time as in the prior art as represented by curve A. The improvement made by caching sequential data shows up in that curve C is disposed beneath curve A until the block lengths get quite long, at which point, as noted above, latency is of less significance than the actual read/write time required.

FIG. 7 shows average input/output time as a function of the percentage of the data called for by the host which is sequential. All the curves assume a relatively busy system. Curve A again shows the performance of a non-cached disk system. No distinction is drawn in such a system between sequential and randomly accessed data, and hence curve A is substantially flat. Curve B represents a cache system in which all data requests are cached. It shows a marked decrease of input/output time as the percentage of sequential data increases, because of less random data is cached unnecessarily, the percentage of sequential data beneficially cached increases, so that performance is improved as reflected in the lowering of the input/output time. However, the percentage of data which is sequential must be quite high before a performance increase is realized. Curve C again shows the input/output time of a cache memory subsystem according to the invention in which only data deemed likely to be sequential is cached. The overall performance improvement shown is attributable to the fact that the cache system is only used in the case of sequential data; director time is not consumed uselessly by caching random data.

As an example of the methods of implementation of the invention, attached hereto as Appendix A is a "pseudocode" rendition of the method of the invention. This pseudocode includes both actual microcode instructions and documentary notes so as to enable one other than the original programmer to understand the program. A document entitled "Chinook Prolog and Pseudocode Conventions" is attached as Appendix A-1 and explains the pseudocode language. Appendix A describes a microcode module entitled "End-Channel Program Processing." It begins with a general description of the program function, and with operational descriptions including the bits which are required from the storage director for its operation, definition of the various subroutines and of the various registers required. The bulk of the program begins at line 01820 (page 4) and comprises actual microcode instructions, for example at lines 02170 through 02370, preceded by English language explanatory matter describing the subject matter of the decisions made by the subsequent microcode, e.g. as at lines 1980 through 2150. The microcode shown performs the overall management function, and calls various subportions as necessary. For example, the deallocation for data integrity subroutine which is described above in connection with FIG. 5 is called at lines 2440-2470 of Appendix A. The actual subroutine is attached as Appendix B. Of this, for example, the steps taken in response to the decision represented by the box 80 in FIG. 5, "Cache Read Error" are shown in English language form at lines 1500 through 1570 and in microcode at lines 1590 through 1730 of Appendix B.

Those skilled in the art given the thus incorporated documentation of the End-Channel Program would have no difficulty in practicing the process of the invention.

Other copending applications which may be of relevance in understanding the present invention are incorporated herein by reference, including copending Ser. No. 325,351 filed Nov. 27, 1981, of Coulson et al entitled "Adaptive Domain Partitioning of Cache Memory Space", now U.S. Pat. No. 4,430,712, which discusses the organization of the memory space comprised in the solid-state cache memory 22 and a continuation-in-part of that application Ser. No. 06/441,791, filed 11/15/82, now U.S. Pat. No. 4,503,501. Error management and recovery functions performed by the cache manager are discussed in copending Ser. No. 325,287 filed Nov. 27, 1981, of Blickenstaff et al, entitled "Data Path Reconfiguration for Error Control", incorporated herein by reference. Also relevant is copending application Ser. No. 325,288 filed Nov. 27, 1981 of Moreno et al entitled "Control of Cache Buffer For Memory Subsystem" and a continuation-in-part of that application Ser. No. 06/441,818, filed 11/15/82, incorporated by reference, which discusses how precise correspondence between storage locations on the disk devices and the cache is maintained.

Those skilled in the art will recognize that there has been described a method for determining the sequential nature of a disk record which satisfies the needs of the art and objects of the invention discussed above. Moreover, it will be recognized that there are numerous ways in which the method of the invention can be embodied and improved upon and that therefore the above disclosure should not be considered as a limitation on the invention but merely as exemplary thereof. The invention is more properly defined by the following claims.

```
                               APPENDIX A
       -- MICROCODE ASSEMBLER 6.8  08/16/82  15:47 21 --
                          PROGRAM: MDFGDD01

END CHANNEL PROGRAM PROCESSING

STATEMENT                                            STMT #

******************** START OF SPECIFICATIONS ********************* ((100020    2
                                                                       *((100030    3
     *  MODULE NAME: MDFGDD01                                          *((100040    4
                                                                       *((100050    5
     *  MODULE TITLE: End Channel Program Processing                   *((100060    6
                                                                       *((100070    7
     *  MODULE OWNER: Rick Coulson                                     *((100080    8
                                                                       *((100090    9
     *  FUNCTIONAL DESCRIPTION                                         *((100100   10
     *  ----------  -----------                                        *((100110   11
     *  This module performs the following End Channel Program functions: *((100120  12
                                                                       *((100130   13
     *      - Store last seek address                                  *((100140   14
     *      - Update statistics                                        *((100150   15
     *      - Release frame (from 'in use' status)                     *((100160   16
     *      - Deallocation determination (data integrity)              *((100170   17
     *      - Frame invalidation (because of cache read errors)        *((100180   18
     *      - Stage determination (algorithm specified by DID)         *((100190   19
     *      - Deallocation determination (performance -- algorithm specified *((100200  20
     *        by DID)                                                  *((100210   21
                                                                       *((100220   22
     *  The algorithms used for stage determination and deallocation   *((100230   23
     *  determination are defined in the prologs of the routines that  *((100240   24
     *  actually do that function. The algorithms to be used (and thus the *((100250  25
     *  segments to be called) are specified by the FE at configuration *((100260  26
     *  time by DID.                                                   *((100270   27
                                                                       *((100280   28
     *  If the 'Update Seek Only' bit is on in the End Channel Program *((100290   29
     *  message, only the store last seek address function is performed. *((100300  30
     *  No stage determination or deallocation determination is performed. *((100310  31
                                                                       *((100320   32
     *  The input to End Channel Program is the Receive buffer. The return *((100330  33
     *  flag indicates any error conditions. The return code indicates *((100340   34
     *  whether or not a Read Stage Parameters command is allowed to   *((100350   35
     *  follow.                                                        *((100360   36
                                                                       *((100370   37
     *  OPERATIONAL DESCRIPTION                                        *((100380   38
     *  ----------- -----------                                        *((100390   39
     *  First, the Update Statistics routine is called to perform the  *((100400   40
     *  statistics keeping portion of End Channel Program. Then (the   *((100410   41
     *  Release Frame service module is called to release the frame and *((100420   42
     *  get the access count along with the algorithm information bytes *((100430   43
     *  associated with the frame. The Deallocation For Data Integrity *((100440   44
     *  routine is called to do any deallocation action needed to preserve *((100450  45
     *  data integrity. ((                                             *((100460   46
                                                                       *((100470   47
     *  An indication of which algorithm is to be used for this DID is *((100480   48
     *  found in the Space Management Status Table. The deallocation   *((100490   49
     *  determination routine corresponding to the specified algorithm is *((100500  50
     *  called, followed by a call to the corresponding stage          *((100510   51
     *  determination routine.                                         *((100520   52
```

```
*       If the channel  program is finished and  not just at the  end of a        *(((00530    53
*       section (the 'True ECP' flag is set), the Dequeue Stage routine is        *(((00540    54
*       called to see if  any stage requests are queued for  this DID.  If        *(((00550    55
*       so, Dequeue Stage sets up the stage parameters for an ensuing Read        *(((00560    56
*       Stage Parameters command and gives a return code indicating that a        *(((00570    57
*       stage is  queued.  The return  code from ECP  is set based  on the        *(((00580    58
*       return code from Dequeue Stage.                                           *(((00590    59
*                                                                                 *(((00600    60
*                                                                                 *(((00610    61
*       Finally, the Update Last Seek routine is called to  store the last        *(((00620    62
*       seek address. If the 'Update Last Seek Only' bit is on, control is        *(((00630    63
*       returned to the caller at this point.                                     *(((00640    64
*                                                                                 *(((00650    65
*  SPECIAL CONSIDERATIONS                                                         *(((00660    66
*  -------- --------------                                                        *(((00670    67
*  none                                                                           *(((00680    68
*                                                                                 *(((00690    69
*  INTERNAL ITEMS    NAME         DESCRIPTION/PARAMETERS                          *(((00700    70
*  -------- -----    ----         ----------------------                          *(((00710    71
*  ENTRY POINT(S):   MDFGDD01     ENTRY PARAMETERS     -    Receive buffer        *(((00720    72
*                                 DID                       RCV_DIDC              *(((00730    73
*                                 FLAG BYTE 1               RCV_FLAG              *(((00740    74
*                                 FLAG BYTE 2               RCV_FLAG              *(((00750    75
*                                 C (HI)                    RCV_DIDC              *(((00760    76
*                                 C (LO)                    RCV_CYLH              *(((00770    77
*                                 H                         RCV_CYLH              *(((00780    78
*                                 NUMBER OF RECORDS         RCV_RCKL              *(((00790    79
*                                 RCRD LEN/ERR ADD 1        RCV_ERRD              *(((00800    80
*                                 RCRD LEN/ERR ADD 2        RCV_ERRA              *(((00810    81
*                                 RCRD LEN/ERR ADD 3        RCV_ERRA              *(((00820    82
*                                                                                 *(((00830    83
*  NORMAL EXIT(S):   caller       RETURN REGISTER GROUP (RTN)                     *(((00840    84
*                                 RETURN FLAG          -    RETFLAG               *(((00850    85
*                                     Bit 0=0 --> Normal End                      *(((00860    86
*                                         =1 --> Check End                        *(((00870    87
*                                     Bit 1=1 --> Send Data                       *(((00880    88
*                                                                                 *(((00890    89
*                                 RETURN CODE          -    RETCODE               *(((00900    90
*                                     Normal End                                  *(((00910    91
*                                         Read Stage Parms  NE_RDSTG              *(((00920    92
*                                     Check End                                   *(((00930    93
*                                                                                 *(((00940    94
*  ERROR EXIT(S):    none                                                         *(((00950    95
*  ROUTINES USED:    MDFGDAS3     Release Frame                                   *(((00960    96
*                    MDFGDSB1     Store Last Seek                                 *(((00970    97
*                    MDFGDDS1     Deallocation For Data Integrity                 *(((00980    98
*                    MDFGDDS2     Update Statistics                               *(((00990    99
*                    MDFGDDS3     Stage Determination - 1 Basic                   *(((01000   100
*                    MDFGDDS4     Deallocation Determination - 1 Basic            *(((01010   101
*                    MDFGDDS3     Stage Determination - 2 Sequential              *(((01020   102
*                    MDFGDDS6     Deallocation Determination - 2 Seq              *(((01030   103
*                    MDFGDDS5     Stage Determination - 3 Random                  *(((01040   104
*                    MDFGDDS8     Deallocation Determination - 3 Random           *(((01050   105
*                    MDFGDSD7     Take Statistics                                 *(((01060   106
*                    MDFGDSE2     Dequeue Stage                                   *(((01070   107
*  MACROS USED:      USAVE        Save the IRG                                    *(((01080   108
*                    UCALLMOD     Call a Module                                   *(((01090   109
*                    UBTRACE      Block Trace                                     *(((01100   110
*                    USETIRG      Change the IRG                                  *(((01110   111
*                    URESTORE     Restore the IRG                                 *(((01120   112
*                    URETURN      Return to Caller                                *(((01130   113
*  DATA STRUCTURES:  MDDGDT09     R/R    Space Management Status (SST)            *(((01140   114
*                    MDDGDT04     R/W    DID Status Table (DST)                   *(((01150   115
*                    MDDGAT01     R/W    Cache Manager Status (CST)               *(((01160   116
*  INTERNAL REGS:    >            >(R/W)  >                                       *(((01170   117
*  EXTERNAL REGS:    IRG          R/W    Register Group Pointer                   *(((01180   118
*                                                                                 *(((01190   119
*  ENTRY IRG:        P(EX STK)    EXIT IRG:  P(EX STK)                            *(((01200   120
*                    S(PL1)                  S(RTN)                               *(((01210   121
*                                                                                 *(((01220   122
*  CHANGE ACTIVITY                                                                *(((01230   123
*  ------ --------                                                                *(((01240   124
*  01/09/81  RLC    START                                                         *(((01250   125
*  02/10/81         D1 SCHEDULED (prolog)                                         *(((01260   126
*  02/10/81         D1 COMPLETED                                                  *(((01270   127
*  03/25/81         I1 SCHEDULED (pseudo code)                                    *(((01280   128
*  03/25/81         I1 COMPLETED                                                  *(((01290   129
*  04/06/81         Changes as a result of new prolog format and review           *(((01300   130
*  04/16/81         Changes as a result of new interface definition               *(((01310   131
*  07/15/81         REAL CODE STARTED                                             *(((01320   132
*  07/23/81         I2 SCHEDULED (real code)                                      *(((01330   133
*  07/24/81         I2 COMPLETED (MODULE SIZE = ??? words)                        *(((01340   134
*  02/10/82  RLC    Changes to incorporate new algorithms                         *(((01350   135
*  02/16/82         Second D1 review scheduled                                    *(((01360   136
*  02/24/82         Second D1 review complete                                     *(((01370   137
*  03/02/82  RLC    Pseudo and real code updates for new algorithms               *(((01380   138
*  03/17/82  RLC    Second I1 review complete                                     *(((01390   139
*  04/07/82  RLC    Pseudo and real code updates for new algorithms               *(((01400   140
*  05/10/82  RLC    Change so only call Release Frame after cache                 *(((01410   141
*                   channel program. Call with last seek address.                 *(((01420   142
*  06/24/82  RLC    Add trace point                                               *(((01430   143
*  07/26/82  RLC    Postpone Store Last Seek until the end of End                 *(((01440   144
*                   Channel Program processing                                    *(((01450   145
*                                                                                 *(((01460   146
********************** END OF SPECIFICATIONS ***********************(((01470   147
                                                                                  *(((01480   148
*---------------------------------------------------------------------*(((01490   149
* LOCALS                                                                          *(((01500   150
*---------------------------------------------------------------------*(((01510   151
ACCCOUNT DEF    P0                          *ACCESS COUNT                         (((01520   152
XXTRKCYL DEF    P0P1                        *TRACKS PER CYLINDER                  (((01530   153
TRKCYL   DEF    P1                                                                (((01540   154
THEAD    DEF    P1                          *TEMPORARY COPY OF HEAD ADDRESS       (((01550   155
TRHEAD   DEF    P2                          *TEMPORARY COPY OF RETURNED HD        (((01560   156
ADDRESS  DEF    P2P3                                                              (((01570   157
ADDRESSH DEF    P2                                                                (((01580   158
ADDRESSL DEF    P3                                                                (((01590   159
```

```
                              TALGINF   DEF  P4P5              *ALGORITHM INFO BYTES         (((01600   160
                              ALGORITH  DEF  P5                *ALGORITHM SPECIFIED          (((01610   161
                              FLAGS     DEF  P6P7              *FLAG BYTES                   (((01620   162
                              FLAG0     DEF  P6                *FLAG BYTE 0                  (((01630   163
                              DASDRERR  DEF  0                   *DASD READ ERROR            (((01640   164
                              CACHRERR  DEF  2                   *CACHE READ ERROR           (((01650   165
                              IMBCYLSK  DEF  3                   *IMBEDDED CYLINDER SEEK     (((01660   166
                              TRSWITCH  DEF  4                   *TRACK SWITCH               (((01670   167
                              WRITEOCC  DEF  5                   *WRITE OCCURRED             (((01680   168
                              IMBHDSK   DEF  6                   *IMBEDDED HEAD SEEK         (((01690   169
                              CHANLRES  DEF  7                   *CHANNEL INTERFACE RESET    (((01700   170
                              FLAG1     DEF  P7                *FLAG BYTE 1                  (((01710   171
                              FIRSTREC  DEF  0                   *FIRST RECORD READ          (((01720   172
                              LASTREC   DEF  1                   *LAST RECORD READ           (((01730   173
                              EOFREC    DEF  2                   *EOF RECORD READ            (((01740   174
                              UPSKONLY  DEF  3                   *UPDATE SEEK ONLY           (((01750   175
                              DASDOPER  DEF  4                   *DASD OPERATION             (((01760   176
                              TRUEECP   DEF  5                   *TRUE END OF CHANNEL PROGRA (((01770   177
                                                                                             (((01780   178
                        *------------------------------------------------------------------*(((01790   179
                        *    ENTRY END CHANNEL PROGRAM PROCESSING                          *(((01800   180
                        *------------------------------------------------------------------*(((01810   181
                                        START  MDFGDD01                                      (((01820   182
                                        ORG    MDFGDD01                                      (((01830   183
                              MDFGDD01  USAVE                   *SAVE THE IRG                (((01840   184
OF00  2DF3              +     MDFGDD01  P3 = IRG                  *SAVE IRG IN P3            (((00520
OF01  27F1              +               IRG = IRG + X10           *INCREMENT PRIMARY GROUP   (((00530
                                        UBTRACE TRC_2040                                     (((01850   185
OF02  1D13              +               JH   MIC.BTRCBIT,TLAB0002  *IF TRACE OFF THEN SKIP
OF03  6FE4              +               DC   TRACEMOD             *BAL INSTR TO TRACE ROUTINE(((00500
OF04  2040              +               DC   X2040                *TRACE ID                  (((00510
                        +     TLAB0002                           *LABEL EQUATED TO NEXT LINE
                                                                                             (((01860   186
                                                                                             (((01870   187
                        *------------------------------------------------------------------*(((01880   188
                        *    Get Flag Bytes                                                 *(((01890   189
                        *------------------------------------------------------------------*(((01900   190
OF05  AA20                              ADDRESSH = $RCVBUF       *SET UP ADDRESS OF RCVBUFFER(((01910   191
OF06  8A30                              ADDRESSL = :RCV_FLAG                                 (((01920   192
OF07  4E26                              FLAGS < (ADDRESS),INC    *GET THE FLAG BYTES         (((01930   193
                                        USETIRG IRG_SECD PL2_SECD *SWITCH TO PL2
OF08  31F0              +               IRG  = IRG . XF0          *Clear appropriate nibble  (((00660
OF09  33F2              +               IRG  = IRG / X02          *Set appropriate nibble    (((00670
OF0A  4E28                              PL2DIDCY < (ADDRESS),INC *PUT DID.C INTO PASS REGS   (((01940   194
OF0B  4A2A                              PL2CHD < (ADDRESS)       *PUT C.H INTO PASS REGS     (((01950   195
                                                                                             (((01960   196
                                                                                             (((01970   197
                        *------------------------------------------------------------------*(((01980   198
                        *    IF update seek only bit not set                                *(((01990   199
                        *                                                                   *(((02000   200
                        *       THEN-DO for update seek only bit not set                    *(((02010   201
                        *          IF 'DASD Operation' is off                               *(((02020   202
                        *             THEN-DO for cache operation                           *(((02030   203
                        *                CALL Get Last Seek                                 *(((02040   204
                        *                   PASS: DID                                       *(((02050   205
                        *                   RECEIVE: DID.C.C.H                              *(((02060   206
                        *                Copy Head-Address to Local-Head                    *(((02070   207
                        *                CALL  Release Frame                                *(((02080   208
                        *                   PASS: DID.C.C.H                                 *(((02090   209
                        *                   RECEIVE: Return flags, Access Count, Algorithm  *(((02100   210
                        *                            Information Bytes                      *(((02110   211
                        *                Store Access Count and Algorithm Information bytes in*(((02120   212
                        *                   Current Channel Program Information table       *(((02130   213
                        *                Set Head-Address to Local-Head                     *(((02140   214
                        *             END-THEN for cache operation                          *(((02150   215
                        *          Store value of last seek for future processing           *(((02160   216
                        *------------------------------------------------------------------*(((02170   217
OF0C  5672                              JL   FLAG1,UPSKONLY,THEN0 *BRANCH IF NOT UPDATE SEEK ONLY(((02180  218
OF0D  0F67                              B    ELSE1                                           (((02190   219
OF0E  5872              THEN0           JL   FLAG1,DASDOPER,THEN1 *TEST IF ON CACHE          (((02200   220
OF0F  0F21                              B    CONT7                *BRANCH IF OP STARTED ON DASD(((02210  221
OF10  7AB1              THEN1           THEAD = PL2HEAD           *MAKE COPY OF HEAD         (((02220   222
                                        UCALLMOD MDFGDSB2         *GET LAST SEEK
OF11  6FE0              +               DC   CALLMOD              *BAL INSTR TO CALL ROUTINE (((00500
OF12  1720              +               DA   MDFGDSB2             *ADDRESS OF CALLED MODULE  (((00510
OF13  7AD2                              TRHEAD = RTN_HEAD         *GET COPY OF LAST SEEK HEAD(((02230   223
OF14  2FF3                              IRG   = SAVEDIRG          *RESTORE IRG TO PL2        (((02240   224
OF15  7A2B                              PL2HEAD = TRHEAD          *MOVE TO PASS REGS         (((02250   225
                                        UCALLMOD MDFGDSA3         *RELEASE FRAME             (((02260   226
OF16  6FE0              +               DC   CALLMOD              *BAL INSTR TO CALL ROUTINE (((00500
OF17  1200              +               DA   MDFGDSA3             *ADDRESS OF CALLED MODULE  (((00510
OF18  7AF0                              ACCCOUNT = ACCESSCT       *PERSERVE ACCESS COUNT     (((02270   227
OF19  4ED4                              TALGINF  = RTNALGIN       *PERSERVE ALGORITHM INFORMATION(((02280 228
                                        USETIRG IRG_SECD CPI_SECD *SWITCH TO CHANNEL PROGRAM INFO(((02290 229
OF1A  31F0              +               IRG  = IRG . XF0           *Clear appropriate nibble (((00660
OF1B  33F6              +               IRG  = IRG / X06           *Set appropriate nibble   (((00670
OF1C  7A08                              CPI_NACC = ACCCOUNT       *STORE ACCESS COUNT        (((02300   230
OF1D  4E5A                              CPI_ALG  = TALGINF        *STORE ALGORITHM INFORMATION(((02310  231
                                        USETIRG IRG_SECD PL2_SECD *SWITCH BACK TO PL2        (((02320   232
OF1E  31F0              +               IRG  = IRG . XF0           *Clear appropriate nibble (((00660
OF1F  33F2              +               IRG  = IRG / X02           *Set appropriate nibble   (((00670
OF20  7A1B                              PL2HEAD  = THEAD          *RESTORE ORIGINAL HEAD     (((02330   233
OF21  8A2F              CONT7           ADDRESSH = $SKSTORE       *STORE LAST SEEK ADDRESS   (((02340   234
OF22  8A3F                              ADDRESSL = :SKSTORE                                  (((02350   235
OF23  482A                              PL2CHD > (ADDRESS)                                   (((02360   236
                                                                                             (((02370   237
                        *------------------------------------------------------------------*(((02380   238
                        *         INCLUDE Update Statistics                                 *(((02390   239
                        *         CALL Deallocation For Data Integrity                      *(((02400   240
                        *              PASS: none                                           *(((02410   241
                        *              RECEIVE: none                                        *(((02420   242
                        *------------------------------------------------------------------*(((02430   243
                                        UCALLSEG MDFGDDS2         *UPDATE STATS              (((02440   244
OF24  6B00              +               BAL   MDFGDDS2            *BRANCH TO ROUTINE (IN 4K) (((00480
                                        USETIRG IRG_SECD PL2_SECD *SWITCH BACK TO PL2        (((02450   245
OF25  31F0              +               IRG  = IRG . XF0           *Clear appropriate nibble (((00660
OF26  33F2              +               IRG  = IRG / X02           *Set appropriate nibble   (((00670
                                        UCALLMOD MDFGDDS1         *DEALLOCATION FOR DATA INTEG(((02460  246
```

```
OF27  6FE0    +            DC    CALLMOD              *BAL INSTR TO CALL ROUTINE  {{{00500
OF28  0C80    +            DA    MDFGDDS1             *ADDRESS OF CALLED MODULE   {{{00510
                                                                                  {{{02470    247
                    *--------------------------------------------------------*{{{02480    248
                    *        SELECT on algorithm specified (SST)              *{{{02490    249
                    *                                                          *{{{02500    250
                    *           DO-WHEN 'Basic' algorithm specified            *{{{02510    251
                    *             CALL Deallocation Determination 1 - Basic    *{{{02520    252
                    *               PASS: none                                 *{{{02530    253
                    *               RECEIVE: none                              *{{{02540    254
                    *             CALL Stage Determination 1 - Basic           *{{{02550    255
                    *               PASS: none                                 *{{{02560    256
                    *               RECEIVE: none                              *{{{02570    257
                    *           END-WHEN 'Basic' algorithm specified           *{{{02580    258
                    *--------------------------------------------------------*{{{02590    259
OF29  31F0                   USETIRG IRG_SECD SST_SECD  *SWITCH TO SST         {{{02600    260
OF2A  33F5                   IRG   = IRG . XF0          *Clear appropriate nibble {{{00660
OF2B  7AF5                   IRG   = IRG / X05          *Set appropriate nibble   {{{00670
OF2C  805F                   ALGORITH = SST_DFLG        *GET ALGORITHM         {{{02610    261
                             ALGORITH = ALGORITH . X0F  *MASK OUT OTHER STUFF  {{{02620    262
OF2D  31F0                   USETIRG IRG_SECD PL2_SECD  *SWITCH TO PASS LINK   {{{02630    263
OF2E  33F2                   IRG   = IRG . XF0          *Clear appropriate nibble {{{00660
OF2F  8C51                   IRG   = IRG / X02          *Set appropriate nibble   {{{00670
OF30  4B37                   D = ALGORITH CE X01        *BASIC ALGORITHM?      {{{02640    264
                             BNEQ  SEL1                 *NO BRANCH TO NEXT ONE {{{02650    265
                             UCALLMOD MDFGDDS4          *BASIC DEALLOC DETERMINATION {{{02660  266
OF31  6FE0    +            DC    CALLMOD              *BAL INSTR TO CALL ROUTINE  {{{00500
OF32  0C00    +            DA    MDFGDDS4             *ADDRESS OF CALLED MODULE   {{{00510
OF33  2FF3                   IRG   = SAVEDIRG           *RESTORE TO PL2        {{{02670    267
                             UCALLMOD MDFGDDS3          *BASIC STAGE DETERMINATION {{{02680 268
OF34  6FE0    +            DC    CALLMOD              *BAL INSTR TO CALL ROUTINE  {{{00500
OF35  0B30    +            DA    MDFGDDS3             *ADDRESS OF CALLED MODULE   {{{00510
OF36  0F53                   B     ENDSEL1             *BRANCH TO END OF SELECT {{{02690    269
                                                                                {{{02700    270
                    *--------------------------------------------------------*{{{02710    271
                    *           DO-WHEN 'Sequential' algorithm specified       *{{{02720    272
                    *             CALL Deallocation Determination 2 - Sequential *{{{02730  273
                    *               PASS: none                                 *{{{02740    274
                    *               RECEIVE: none                              *{{{02750    275
                    *             CALL Stage Determination 2 - Sequential      *{{{02760    276
                    *               PASS: none                                 *{{{02770    277
                    *               RECEIVE: none                              *{{{02780    278
                    *           END-WHEN 'Sequential' algorithm specified      *{{{02790    279
                    *--------------------------------------------------------*{{{02800    280
OF37  8C52       SEL1        D = ALGORITH CE X02        *SEQUENTIAL ALGORITHM? {{{02810    281
OF38  4B3F                   BNEQ  SEL2                 *NO BRANCH TO NEXT ONE {{{02820    282
                             UCALLMOD MDFGDDS6          *SEQ DEALLOC DETERMINATION {{{02830 283
OF39  6FE0    +            DC    CALLMOD              *BAL INSTR TO CALL ROUTINE  {{{00500
OF3A  1100    +            DA    MDFGDDS6             *ADDRESS OF CALLED MODULE   {{{00510
OF3B  2FF3                   IRG   = SAVEDIRG           *RESTORE TO PL2        {{{02840    284
                             UCALLMOD MDFGDDS5          *SEQ STAGE DETERMINATION {{{02850  285
OF3C  6FE0    +            DC    CALLMOD              *BAL INSTR TO CALL ROUTINE  {{{00500
OF3D  0D00    +            DA    MDFGDDS5             *ADDRESS OF CALLED MODULE   {{{00510
OF3E  0F53                   B     ENDSEL1             *BRANCH TO END OF SELECT {{{02860    286
                                                                                {{{02870    287
                    *--------------------------------------------------------*{{{02880    288
                    *           DO-WHEN 'Random' algorithm specified           *{{{02890    289
                    *             CALL Deallocation Determination 3 - Random   *{{{02900    290
                    *               PASS: none                                 *{{{02910    291
                    *               RECEIVE: none                              *{{{02920    292
                    *             CALL Stage Determination 3 - Random          *{{{02930    293
                    *               PASS: none                                 *{{{02940    294
                    *               RECEIVE: none                              *{{{02950    295
                    *           END-WHEN 'Random' algorithm specified          *{{{02960    296
                    *--------------------------------------------------------*{{{02970    297
OF3F  8C53       SEL2        D = ALGORITH CE X03        *RANDOM ALGORITHM?     {{{02980    298
OF40  4B47                   BNEQ  SEL3                 *NO BRANCH TO NEXT ONE {{{02990    299
                             UCALLMOD MDFGDDS8          *RND DEALLOC DETERMINATION {{{03000 300
OF41  6FE0    +            DC    CALLMOD              *BAL INSTR TO CALL ROUTINE  {{{00500
OF42  11A0    +            DA    MDFGDDS8             *ADDRESS OF CALLED MODULE   {{{00510
OF43  2FF3                   IRG   = SAVEDIRG           *RESTORE TO PL2        {{{03010    301
                             UCALLMOD MDFGDDS7          *RND STAGE DETERMINATION {{{03020  302
OF44  6FE0    +            DC    CALLMOD              *BAL INSTR TO CALL ROUTINE  {{{00500
OF45  1130    +            DA    MDFGDDS7             *ADDRESS OF CALLED MODULE   {{{00510
OF46  0F53                   B     ENDSEL1             *BRANCH TO END OF SELECT {{{03030    303
                                                                                {{{03040    304
                    *--------------------------------------------------------*{{{03050    305
                    *                                                          *{{{03060    306
                    *           OTHERWISE HALT - bad algorithm specified       *{{{03070    307
                    *                                                          *{{{03080    308
                    *        END-SELECT on algorithm specified                 *{{{03090    309
                    *                                                          *{{{03100    310
                    *        IF 'True End Channel Program' flag on             *{{{03110    311
                    *        THEN CALL Dequeue Stage                           *{{{03120    312
                    *               PASS: none                                 *{{{03130    313
                    *               RECEIVE: Return Flag                       *{{{03140    314
                    *             (* use these return values as the Return Code for *{{{03150  315
                    *                this module *)                            *{{{03160    316
                    *             ELSE-DO for not true end of channel program  *{{{03170    317
                    *               Set normal end return flag                 *{{{03180    318
                    *               Set zero return code                       *{{{03190    319
                    *             END-ELSE for not true end of channel program *{{{03200    320
                    *             Get last seek address stored previously      *{{{03210    321
                    *             CALL Store Last Seek                         *{{{03220    322
                    *               PASS: DID.C.C.H                            *{{{03230    323
                    *               RECEIVE: none                              *{{{03240    324
                    *        END-THEN for update seek only bit not set         *{{{03250    325
                    *--------------------------------------------------------*{{{03260    326
                 SEL3        UHALT HALT_X63             *ILLEGAL ALGORITHM SPECIFIED {{{03270 327
OF47  1D13    + SEL3         JH    MIC.BTRCBIT.TLAB0013 *BRANCH IF TRACE NOT ON {{{00550
OF48  6FE4    +            DC    TRACEMOD             *BAL TO TRACE MODULE
OF49  FF63    +            DB    XFF,X63              *TRACE X63
OF4A  BA00    + TLAB0013   P0    = X00                *CLEAR HIGH ORDER BYTE    {{{00550
OF4B  BA13    +            P1    = X63                *GET HALT X63             {{{00560
OF4C  BB20    +            P2    = $CCT_TABL          *SET UP ADDRESS TO CCT    {{{00570
OF4D  4004    +            POP1  > (P2..:CCT_HERR)    *STORE HALT ID IN CCT     {{{00580
OF4E  23D2    -            XBP   = XBP / SWBANK1      *SWITCH TO BANK 1
```

```
OF4F  2311    +            MDR    = MDR / X10                *INHIBIT DESELECTION RESET
OF50  21DD    +            XBP    = XBP . SWBANK0             *SWITCH TO BANK 0
OF51  23C4    +            ILR    = ILR / ILR_SET1            *CAUSE LEVEL 1 INTERRUPT
OF52  OF52    +            B      LOOP                        *HANG                        (((00590
OF53  5A78           ENDSEL1 JL   FLAG1.TRUEECP.ELSE           *BRANCH IF NOT TRUE ECP      (((03280     328
OF54  2FF3                  IRG   = SAVEDIRG                   *RESTORE TO PL2              (((03290     329
                            UCALLMOD MDFGDSE2                  *DEQUEUE STAGE               (((03300     330
OF55  6FE0    +             DC    CALLMOD                      *BAL INSTR TO CALL ROUTINE  (((00500
OF56  1A50    +             DA    MDFGDSE2                     *ADDRESS OF CALLED MODULE   (((00510
OF57  5186                  JH    RETFLAG.NOTFOUND.NTFOUND      *BRANCH IF NO STAGE PENDING (((03310     331
OF58  AA90                  RETCODE = NE_RDSTG                  *SET READ STAGE PARMS      (((03320     332
OF59  8A80                  RETFLAG = NORMEND                   *SET ZERO RETURN FLAG      (((03330     333
OF5A  OF5F                  B     DONE1                                                    (((03340     334
                     ELSE   USETIRG IRG_SECD RTN_SECD           *SWITCH TO RETURN REGS     (((03350     335
OF5B  31F0    + ELSE         IRG   = IRG . XF0                   *Clear appropriate nibble (((00660
OF5C  33F4    +              IRG   = IRG / X04                   *Set appropriate nibble   (((00670
OF5D  8A90          NTFOUND  RETCODE = NE_NORM                  *SET NORMAL RETURN CODE    (((03360     336
OF5E  8A80                   RETFLAG = NORMEND                  *SET ZERO RETURN FLAG      (((03370     337
                     DONE1   USETIRG IRG_SECD PL2_SECD          *SWITCH TO PL2             (((03380     338
OF5F  31F0    + DONE1        IRG   = IRG . XF0                   *Clear appropriate nibble (((00660
OF60  33F2    +              IRG   = IRG / X02                   *Set appropriate nibble   (((00670
OF61  8A2F                   ADDRESSH = $SKSTORE                *RETRIEVE LAST SEEK ADDRESS(((03390     339
OF62  BA3F                   ADDRESSL = :SKSTORE                                           (((03400     340
OF63  4A2A                   PL2CHD < (ADDRESS)                                            (((03410     341
                             UCALLMOD MDFGDSB1                 *CALL STORE LAST SEEK       (((03420     342
OF64  6FE0    +              DC    CALLMOD                     *BAL INSTR TO CALL ROUTINE  (((00500
OF65  1700    +              DA    MDFGDSB1                     *ADDRESS OF CALLED MODULE  (((00510
OF66  OF6B                   B     DONE                                                    (((03430     343
                                                                                           (((03440     344
                     *-------------------------------------                                 (((03450     345
                     *   ELSE-DO update seek only bit set                                  *(((03460     346
                     *      Set normal return flag                                         *(((03470     347
                     *      CALL Store Last Seek                                           *(((03480     348
                     *         PASS: DID.C.C.H                                             *(((03490     349
                     *         RECEIVE: none                                               *(((03500     350
                     *      Set zero return code                                           *(((03510     351
                     *   END-ELSE update seek only bit set                                 *(((03520     352
                     *-------------------------------------                                *(((03530     353
                     ELSE1   UCALLMOD MDFGDSB1                  *STORE LAST SEEK           (((03540     354
OF67  6FE0    + ELSE1        DC    CALLMOD                     *BAL INSTR TO CALL ROUTINE  (((00500
OF68  1700    +              DA    MDFGDSB1                     *ADDRESS OF CALLED MODULE  (((00510
OF69  8A90                   RETCODE = NE_NORM                 *ZERO RETURN CODE           (((03550     355
OF6A  8A80                   RETFLAG = NORMEND                 *NORMAL END                 (((03560     356
                                                                                           (((03570     357
                                                                                           (((03580     358
                     * RETURN                                                              *(((03590     359
                                                                                           *(((03600     360
                     DONE    URESTORE                          *RESTORE THE IRG            (((03610     361
OF6B  31F0    + DONE         IRG   = IRG . XF0                 *ZERO SECONDRY REGISTER GRP (((00510
OF6C  37F4    +              IRG   = IRG + X04                 *SET SECONDARY TO 4         (((00520
OF6D  27FF    +              IRG   = IRG + XFF                 *AND DECREMENT PRIMARY      (((00530
                             URETURN                           *RETURN TO CALLER           (((03620     362
OF6E  4C54    +              BALR  P4P5. P4P5                  *RETURN TO CALLER           (((00480
                                                                                           (((03630     363
OF6F  0000           SKSTORE DC    X00                         *TEMPORARY LOCATION FOR SK ADDR(((03640  364
OF70                         END                                                           (((03650     365
                                     ** LABEL TABLE WITH REFERENCES **

EQUATE
           LABEL       ADDR    VALUE                  REFERENCE ADDRESSES

ACCCOUNT            P0              OF1B OF1C
           ACCESSCT            S7              OF1B
           ADDRESS             P2P3            OF07 OF0A OF0B OF23 OF63
           ADDRESSH            P2              OF05 OF21 OF61
           ADDRESSL            P3              OF06 OF22 OF62
           ALGORITH            P5              OF2B OF2C OF2C OF2F OF37 OF3F
           BTRCBIT             6               OF02 OF47
           CALLMOD             X6FE0           OF11 OF16 OF27 OF31 OF34 OF39 OF3C OF41 OF44 OF55 OF64 OF67
           CCT_HERR            X7004           OF4D
           CCT_TABL            X7000           OF4C
           CONT7       OF21                    OF0F
           CPI_ALG             S2S3            OF1D
           CPI_NACC            S0              OF1C
           CPI_SECD            X06             OF1A
           DASDOPER            4               OF0E
           DONE        OF6B                    OF66
           DONE1       OF5F                    OF5A
           ELSE        OF5B                    OF53
           ELSE1       OF67                    OF0D
           ENDSEL1     OF53                    OF36 OF3E OF46
           FLAGS               P6P7            OF07
           FLAG1               P7              OF0C OF0E OF53
           HALT_X63            X63             OF47
           ILR                 E28             OF51 OF51
           ILR_SET1            X40             OF51
           IRG                 E31             OF00 OF01 OF01 OF08 OF08 OF09 OF09 OF14 OF1A OF1A OF1B OF1B OF1E OF1E OF1F OF1F
                                               OF25 OF25 OF26 OF26 OF29 OF29 OF2A OF2A OF2D OF2D OF2E OF2E OF33 OF3B OF43 OF54
                                               OF5B OF5B OF5C OF5C OF5F OF5F OF60 OF60 OF6B OF6B OF6C OF6C OF6D OF6D
           IRG_SECD            XF0             OF08 OF1A OF1E OF25 OF29 OF2D OF5B OF5F
           MDFGDDS1            X0C80           OF2B
           MDFGDDS2            X0B00           OF24
           MDFGDDS3            X0B30           OF35
           MDFGDDS4            X0C00           OF32
           MDFGDDS5            X0D00           OF3D
           MDFGDDS6            X1100           OF3A
           MDFGDDS7            X1130           OF45
           MDFGDDS8            X11A0           OF42
           MDFGDDO1            X0F00           OF00 0000
           MDFGDSA3            X1200           OF17
           MDFGDSB1            X1700           OF65 OF68
           MDFGDSB2            X1720           OF12
           MDFGDSE2            X1A50           OF56
           MDR                 E17             OF4F OF4F
```

```
MIC                E17              OF02 OF47
NE_NORM            X00              OF5D OF69
NE_RDSTG           X40              OF58
NORMEND            X00              OF59 OF5E OF6A
NOTFOUND           0                OF57
                          EQUATE
LABEL      ADDR    VALUE                              REFERENCE ADDRESSES

NTFOUND    OF5D                     OF57
PL2_SECD           X02              OF0B OF1E OF25 OF2D OF5F
PL2CHD             S2S3             OF0B OF23 OF63
PL2DIDCY           S0S1             OF0A
PL2HEAD            S3               OF10 OF15 OF20
RCV_FLAG           X4000            OF06
RCVBUF             X4000            OF05
RETCODE            S1               OF58 OF5D OF69
RETFLAG            S0               OF57 OF59 OF5E OF6A
RTN_HEAD           S5               OF13
RTN_SECD           X04              OF5B
RTNALGIN           S4S5             OF19
SAVEDIRG           P3               OF14 OF33 OF3B OF43 OF54
SEL1       OF37                     OF30
SEL2       OF3F                     OF38
SEL3       OF47                     OF40
SKSTORE    OF6F                     OF21 OF22 OF61 OF62
SST_DFLG           S7               OF2B
SST_SECD           X05              OF29
SWBANK0            XDF              OF50
SWBANK1            X20              OF4E
TALGINF            P4P5             OF19 OF1D
THEAD              P1               OF10 OF20
THEN0      OF0E                     OF0C
THEN1      OF10                     OF0E
TLAB0002   OF05                     OF02
TLAB0013   OF4A                     OF47
TRACEMOD         — X6FE4            OF03 OF48
TRC_2040           X2040            OF02
TRHEAD             P2               OF13 OF15
TRUEECP            5                OF53
UPSKONLY           3                OF0C
XBP                E29              OF4E OF4E OF50 OF50
```

APPENDIX A-1

DMRB14
CHINOOK PROLOG AND PSEUDO-CODE CONVENTIONS

FROM: RON BLICKENSTAFF
      BRIAN TREDE

CC: CHINOOK Group

DATE: 11/14/80    LATEST REVISION: 08/12/82

This design memo attempts to document the conventions used by the Chinook microcode group in the development of the microcode for the Cache buffer subsystem. The description of these conventions is divided into two parts: the prolog and the pseudo code.

Figure 1 shows the prolog skeleton used when creating a new microcode module. The engineer fills in each section as he or she designs the module. After the module is designed, it is reviewed via the design review process. This is the 'D1' step. The pseudo code is then written and is also reviewed via the design review process. This is the 'I1' step. After the pseudo code has been reviewed and approved, then the actual microcode is written. The pseudo code is blocked off as comment lines and the microcode for each block of pseudo code is placed directly underneath the pseudo code block. The microcode is then reviewed and/or simulated. This is the 'I2' step. By following this method of design and implementation, the resultant module is self documenting. All the steps of the design are documented in the finished listing for that module.

```
&MOD3     TITLE '>B'
********************* START OF SPECIFICATIONS *********************
*
* MODULE NAME:  >A
*
* MODULE TITLE: >B
*
* MODULE OWNER: >
*
* FUNCTIONAL DESCRIPTION
* ---------- -----------
* >(WHAT the module does - include all functions provided. Be sure
*    to include a high level description of the parameters passed
*    into and out of the module.)
*
* OPERATIONAL DESCRIPTION
* ----------- -----------
* >(HOW the module does it - this is an overview)
*
* SPECIAL CONSIDERATIONS
* ------- --------------
* >(such as timings, configuration, device types, integrity,
*   initialization requirements, execution level)
*
* INTERNAL ITEMS    NAME      DESCRIPTION/PARAMETERS
* --------- -----   ----      ----------------------
* ENTRY POINT(S):   >A        >
* NORMAL EXIT(S):   >         >
* ERROR EXIT(S):    >         >
```

```
 . ROUTINES USED:    >          >
 . MACROS USED:      >          >
 . DATA STRUCTURES:  >          >(R/W) >
 . INTERNAL REGS:    >          >(R/W) >
 . EXTERNAL REGS:    >          >(R/W) >
 .
 . ENTRY IRG:        >          EXIT IRG:  >
 .
 . CHANGE ACTIVITY
 . ------ --------
 . MM/DD/YY         START
 . MM/DD/YY         O1 SCHEDULED (prolog)
 . MM/DD/YY         O1 COMPLETED
 . MM/DD/YY         I1 SCHEDULED (pseudo code)
 . MM/DD/YY         I1 COMPLETED
 . MM/DD/YY         I2 SCHEDULED (real code)
 . MM/DD/YY         I2 COMPLETED (MODULE SIZE = ??? words)
 . >(m/d/y) >(by) >(change #) >(change description)
 .
 ********************* END OF SPECIFICATIONS *********************
```

Chinook Prolog Skeleton
FIGURE 1

PROLOG CONVENTIONS
------ -----------

The following discussion describes the usage of each of the sections in the prolog skeleton.

1) &MOD3    TITLE '>B'
   This line performs two functions: The &MOD3 is ignored by the assembler but is used by the Chinook script control file when the module is imbedded into the Chinook design specification. The TITLE is used by the assembler to assign a title to each page of the listing output for this module. The capital 'B's (and 'A's) are for convenience when filling in the skeleton.

2) MODULE NAME is the 1 to 8 character name assigned to this module and is usually the same as the label used by other modules to call this module.

3) MODULE TITLE is the actual title of the module that describes what the module is for.

4) MODULE OWNER is the name or initials of the engineer responsible for the design and implementation of this module. The module owner information is deleted when the microcode is finally released.

5) FUNCTIONAL DESCRIPTION is an english description of WHAT the module does. This includes a description of all the major functions provided to the caller. Avoid providing details of how the functions are accomplished (see the next section). Also included in this section in a final paragraph is a high level description of the parameters that are directly passed to and returned from this module. Avoid confusing the more global concepts of input and output with the more specific concepts of parameter passage here. An example of this is as follows: A module is created that outputs a line of text to a video display tube. An input parameter might be the text itself or a pointer to a message stored in a table. The output of the module is the line of text displayed on the video tube. However there may not be any parameters returned to the caller. In this case, the paragraph would state that there are no parameters passed back to the caller. The preceeding paragraphs would state that the function of this module is to display a specified line of text to a video display tube.

6) OPERATIONAL DESCRIPTION is a description of HOW the module accomplishes its function(s). The Operational Description should give the reader an overview of the basic flow (or structure) of the module. The tendency to avoid here is that of getting so specific that this section becomes a prose duplication of the pseudo code to follow. The basic concept to be kept in mind is that the level of detail generally increases as the progression is made from Operational Description to pseudo code to microcode.

7) SPECIAL CONSIDERATIONS is a section that describes constraints, requirements, or subtle pieces of information that affect the design or the execution of this module.

8) ENTRY POINT(S): this section contains a list of the label names of all the entry points to the module and the corresponding descriptions of the specific input parameters for each entry. These descriptions go down to the bit level if necessary and also tell the user of the module how the parameters are passed (via a pass table or specific internal registers, for example).

9) NORMAL EXIT(S): this section contains a list of the label names of the exits from this module that are not error exits. Hopefully there will only be a single exit from most modules, and that will be a return to the caller. If the normal exit is a return to the caller, then the word 'caller' is placed in the name column for this entry. A description of the output (return) parameters for each exit is included and contains the same level of detail as that used for the input parameters described above.

10) ERROR EXIT(S): this section contains a list of the error exits and a one line description of the error for each exit. If parameters are passed, these are then described underneath the error description.

11) ROUTINES USED: this section is a list of the names of all the routines that are called by this module. The titles of each of the used routines are also included. Input and output parameters are not included here since they are described in the prolog of the called routine.

12) DATA STRUCTURES: is a list of all the tables or other data structures that are utilized by this module. The title of each data structure is also included. In addition, it is helpful to put a 3 or 4 character abbreviation of the table title in parenthesis at the end of the title. This abbreviation can then be used in the pseudo code for variable definition (see the Variables section of Pseudo-code Conventions).

13) INTERNAL REGS: this section is specific to the current microprocessor design and describes the internal registers of the current primary group that are affected by this module. If the module increments the IRG and does not affect the current group, then this section should state 'current group not affected'.

14) EXTERNAL REGS: this section describes the usage of the external registers by this module. The description (or title) of each external register used is listed under the description column.

15) ENTRY and EXIT IRG: this section defines what the expected value of the IRG (Internal Register Group) is when this module is called and what the value will be when this module is exited.

16) CHANGE ACTIVITY is a section that documents the progress of the module as it passes through the design, implementation, and debug phases. The tendency is to not fill this section in. However, if filled in, this section can provide useful information for the project manager when the next project is planned. The final item under Change Activity is meant to be used whenever a change is made to the module after it has entered system test. This is a useful way of charting the changes to a module that have occurred after the initial design process has been completed.

A final note on the time at which each of these sections should be filled out: All sections through Special Considerations should be filled out prior to the 'D1' review. The Routines Used and the Data Structures sections should be filled out prior to the 'I1' review. The Change Activity section should obviously be filled in as the appropriate milestones or changes are made. The remaining sections should be filled in when the actual microcode is written.

PSEUDO-CODE CONVENTIONS

The writing of pseudo code is a difficult art to develop. The pseudo code is meant to be a bridge between the prolog's operational description and the microcode itself. There seems to be either the tendency to make the pseudo code too general or too specific and detailed. If it is too general, then it becomes a duplication of the operational description and does not contain enough detail for the 'I1' reviewers to satisfactorily check out the design. If it is too specific, then it becomes a duplication of the microcode and contains so much detail that the reader becomes bogged down and looks instead at the actual microcode. The trick is to maintain a happy medium between these two extremes.

The pseudo code language used for the CHINOOK project consists of the following pseudo code control keywords. The purpose of the keywords is twofold: First, consistancy between microcoders is achieved. It is much easier to understand another persons code if it looks similar to your own code. Second, the module becomes much more structured by using standard conventions for decisions, loops, and linkage.

A final philisophical note: if the microcode does not follow the pseudo code as closely as possible, or if the microcode is changed during the debug phase of the project but the pseudo code is not updated, then it becomes less than worthless and can actually contribute to confusion and errors in understanding.

The pseudo code conventions are:

1) All pseudo code keywords must be capitalized. When two keywords appear together (END-THEN), they will be hyphenated.

2) Pseudo code begins in column three and each level of nesting is indented two spaces.

3) The use of Set and Initialize words in comments and pseudo code is often ambiguous. While the usage of Reset is generally accepted as meaning 'put it to the inactive (or zero) state', the usage of Set or Initialize often means one thing to the author while the reader may interpret them differently. By being a little more explicit, this confusion could be eliminated. Such as:

Not -- Set the 'Cache Mode' flag
       But -- Set the 'Cache Mode' flag on
   Not -- Initialize the Status Table
       But -- Initialize the Status Table to zeros (x00)
   Not -- Initialize the print buffer
       But -- Initialize the print buffer to blanks (x40)

4) All variables are either

A) enclosed by single quotes, such as 'temp return code' (this allows for single word variables), or B) hyphenated and the first letter of each word is capitalized, such as Temp-Return-Code.

Flags follow either format but also include the word flag or the word bit following the variable name, such as 'streaming active' flag or Streaming-Active-Bit.

Note: Either convention for variable naming is acceptable. However, be consistent within all of your modules.

Variable names are further modified by specifying where they are coming from the first time they are used in a module. For example:

```
Tag-Code (local)  = a locally defined variable
Tag-Code (L)      = a locally defined variable
Tag-Code (input)  = a variable passed to this module
Tag-Code (I)      = a variable passed to this module
Tag-Code (output) = a variable passed from this module
Tag-Code (O)      = a variable passed from this module
Tag-Code (CST)    = a global variable that resides in the
                    table with the corresponding abbrevia-
                    tion in the Data Structures section of
                    the prolog
```

Listed below are the pseudo keywords, followed by examples of their use. One of the primary benefits of pseudo code is to separate code into small cohesive units. Thus, the pseudo language is designed to block code by using 'DO' 'END' groups.

DECISIONS

Keywords.

```
IF
THEN (NULL)
ELSE (NULL)
THEN-DO
END-THEN
ELSE-DO
END-ELSE
```

All decisions must begin with the 'IF' keyword. The next part of the pseudo code depends on what action is performed. If for example, the positive leg of the test consists of only one pseudo instruction the 'THEN' form of the code is used. If the leg consists of two or more pseudo instructions the 'THEN-DO', 'END-THEN' form is used.

The NULL keyword is used for pseudo code completeness, but does not result in real code other than possibly a branch. If a test is made on one condition but the action is performed on the other, the THEN leg becomes null and the THEN NULL statement must be used. If the ELSE leg is null, the ELSE NULL statement is optional. The NULL is not part of the THEN or ELSE keyword, but is the action performed. Thus, it is not hyphenated.

Examples

```
IF the enable/disable switch is disabled
  THEN set the 'disable' flag on

IF the enable/disable switch is disabled
  THEN-DO for disabled
    Set the 'disable' flag on
    Setup to notify the cache director
  END-THEN for disabled IF the enable/disable switch is disabled
  THEN set the 'disable' flag on
  ELSE set the 'enable' flag on IF the enable/disable switch is disabled
  THEN-DO for disabled
    Set the 'disable' flag on
```

```
      Setup to notify the cache director
   END-THEN for disabled
   ELSE-DO for enabled
      Set the 'enable' flag on
      Setup to continue
   END-ELSE for enabled IF the 'deselection reset' or 'check 1 reset' flags are on and
      the 'table update in progress' and 'reset pending' flags are off
   THEN NULL for deselection reset
   ELSE-DO for general reset
      Reset the 'deselection reset' flag
      Reset the 'check 1 reset' flag
   END-ELSE for general reset
```

LOOPS

Keywords:

DO-WHILE
END-WHILE

DO-UNTIL
END-UNTIL

WAIT

HALT

Loops are coded in several ways. Either the check for the exit from the loop is done at the beginning of the loop or at the end. If it is done at the end, then the loop will always be executed at least once. The DO-WHILE has the check in the beginning while the DO-UNTIL checks at the end.

A third type of loop is a one word loop which spins on a condition, waiting for the condition to come or go away. These are coded using the WAIT keyword.

A fourth type of loop is a one word loop which is used during the debug phase of a product. It is used to detect internal logic problems that should not occur and are normally not even coded because it would be to expensive. To attempt to find these problems during the testing phase, the HALT keyword is used. The HALT statements result in execution of a macro which does a one word loop during the test phase. When the product is shipped, the macro can be changed to a NOP or to a generalized recovery routine.

Examples:

```
DO-WHILE there are valid entries in the directory
   Save the device type in the LRU table
   Save the time stamp in the LRU table
END-WHILE there are valid entries in the directory DO-UNTIL there are no valid entries in the directory
   Save the device type in the LRU table
   Save the time stamp in the LRU table
END-UNTIL there are no valid entries in the directory WAIT for tag valid to rise HALT because the Cache Directory indicates 'Stage in Progress'
```

ROUTING

Keywords:

SELECT
WHEN
DO-WHEN
END-WHEN
OTHERWISE (NULL)
DO-OTHERWISE
END-OTHERWISE
END-SELECT

The case form of this pseudo code uses the SELECT, WHEN, OTHERWISE, keywords. It is used to select only one option when there are many to choose from. The WHEN keyword is used to select the options you need to process, while the OTHERWISE keyword is used at the end of the select structure to catch the remaining or invalid options. In any SELECT structure the OTHERWISE keyword must be used. If no action is to be taken in the OTHERWISE, then the OTHERWISE NULL statement must be used.

If there are only two options then a simple IF,THEN, ELSE, structure would suffice. If there is more than one option possible then the IF, THEN with a null ELSE structure would be used.

Example:

```
SELECT on tag
   DO-WHEN a poll command - tag 02
      CALL Poll module
         PASS: tag, command
         RECEIVE: Bus-In-Value
      Set response in bus-in
      Send response
   END-WHEN for poll command - tag 02
```

```
  WHEN read or write command - tags OE or OF
    CALL the Space Management module
      PASS: Tag-Value, Command-Value, Data-Length, Parms-Byte
      RECEIVE: Return-Code, Status-Byte, Data-Received
  WHEN read or write diagnostic command - tag OC or OD
    CALL the Diagnostic Management module
      PASS: Tag-Value, Command-Value, Data-Length, Parms-Byte
      RECEIVE: Return-Code, Status-Byte, Data-Received
  OTHERWISE for an invalid tag
    Set Return-Code (output) for an invalid tag
END-SELECT on tag
```

LINKAGE

Keywords:

```
ENTRY
CALL
  PASS:
  RECEIVE:
TRANSFER
  (PARM LIST:)
INCLUDE
RETURN
```

These keywords are used to block a module, or pass control to another module. The PASS and RECEIVE fields on the CALL keyword are designed to force narrow interfaces. You should always be able to state exactly what parameters are exchanged.

The CALL keyword is used when a module or subroutine is being invoked and return is expected. If a return is not expected, then the TRANSFER keyword is used. TRANSFER should only be used in special situations such as Reset, TRANSFERring control back to the Idle Loop, or error exits to a central error recovery handler. The PARM LIST keyword is optional and is used when parameters are passed during a TRANSFER.

The INCLUDE keyword is used to include a segment of code inline into the module. Segments are created to package a module into small logically cohesive units. They are used instead of subroutines because they are invoked in only one place. Because of addressing and assembler restrictions, segments in the CHINOOK system are implemented using the BALR instruction.

Example:

```
ENTRY Space Manager
SELECT by command
  DO-WHEN a directory search
    Set DID-CC-H for search routine
    CALL Search Routine to see if entry is in the Cache
      PASS: DID-CC-H
      RECEIVE: 'found' flag
    IF DID-CC-H was found
      THEN set 'found' flag
      ELSE TRANSFER to the Reset Manager
    Save the DID-CC-H in the device table
  END-WHEN for directory search
  WHEN a read frame id
    INCLUDE the read frame id segment END-SELECT by command
RETURN to caller
```

When parameters to be passed to a module are not to be referenced anymore after they are passed, the CALL statement may be stated in either of two ways:

```
Set Tag-Bus for a write tag
Set Bus-Out for a directory search command and residual count
CALL Send Tag module (MX123) to send the tag
  PASS: Tag-Bus, Bus-Out
  RECEIVE  Bus-In-Value or CALL Send Tag module (MX123) to send a directory search command
  PASS: tag bus, bus-out
  RECEIVE  Bus-In-Value
```

In addition, when a parameter received from a called module is not used, the CALL statement may be stated as follows:

```
CALL Send Tag module (MX123) to send a directory search command
  PASS: tag bus, bus-out
  RECEIVE: Bus-In-Value (not used)
```

Do not specify 'nothing' as received from the called module, as this will lead to confusion as to whether or not the module designer is aware of the proper pass/return parameters for the called module.

APPENDIX B

DEALLOCATION FOR DATA INTEGRITY

```
                              STATEMENT                                             STMT #

******************** START OF SPECIFICATIONS *******************•(((00020      2
                                                                 •(((00030      3
*   MODULE NAME: MDFGDDS1                                        •(((00040      4
*                                                                •(((00050      5
*   MODULE TITLE: DEALLOCATION FOR DATA INTEGRITY                •(((00060      6
*                                                                •(((00070      7
*   MODULE OWNER: Rick Coulson                                   •(((00080      8
*                                                                •(((00090      9
*   FUNCTIONAL DESCRIPTION                                       •(((00100     10
*   ---------- -----------                                       •(((00110     11
*   This module deallocates frames according to the flags set in the  •(((00120  12
*   End Channel Program command. Frames are only deallocated if they  •(((00130  13
*   represent a data integrity exposure.                         •(((00140     14
*                                                                •(((00150     15
*   If the 'Cache Read Error' flag is on then permanently deallocate  •(((00160  16
*   the frame to which the channel program was executing.        •(((00170     17
*                                                                •(((00180     18
*   If the 'Write Occurred' flag and the 'Head Seek' flag are both on,  •(((00190  19
*   deallocate the cylinder to which the channel program was     •(((00200     20
*   executing.                                                   •(((00210     21
*                                                                •(((00220     22
*   If the 'Write Occurred' flag and the 'Track Switch' flag are both  •(((00230  23
*   on, deallocate the range between the starting head and the ending  •(((00240  24
*   head.                                                        •(((00250     25
*                                                                •(((00260     26
*   If the 'Write Occurred' flag is on but neither 'DASD Operation' or  •(((00270  27
*   'Track Switch' or 'Head Seek' are on, deallocate the track to  •(((00280  28
*   which the channel program was executing.                     •(((00290     29
*                                                                •(((00300     30
*   No parameters are explicitly passed to this module and none are  •(((00310  31
*   returned to the caller.                                      •(((00320     32
*                                                                •(((00330     33
*   OPERATIONAL DESCRIPTION                                      •(((00340     34
*   ----------- -----------                                      •(((00350     35
*   If the 'Cache Read Error' flag is on, the Permanently Deallocate  •(((00360  36
*   Frame routine is called to remove the frame from active service.  •(((00370  37
*                                                                •(((00380     38
*   If the 'Write Occurred' flag is on, then the action to take  •(((00390     39
*   depends on the value of 'Imbedded Head Seek' and the 'Track  •(((00400     40
*   Switch' flags. When 'Imbedded Head Seek' is on, call the     •(((00410     41
*   Deallocate Range routine, passing 0 and the number of tracks per  •(((00420  42
*   cylinder as the range. This will cause the entire cylinder to be  •(((00430  43
*   deallocated. When 'Track switch' is on, call Get Last Seek to get  •(((00440  44
*   the head address the channel program started on. Then call  •(((00450     45
*   Deallocate Range to invalidate all tracks between the starting  •(((00460  46
*   head and the current head inclusive. If neither 'DASD Operation'  •(((00470  47
*   or 'Imbedded Head Seek' or 'Track Switch' is on, call Deallocate  •(((00480  48
*   Frame to invalidate the frame containing the specified track.  •(((00490  49
*                                                                •(((00500     50
*   SPECIAL CONSIDERATIONS                                       •(((00510     51
*   ------- --------------                                       •(((00520     52
*   Remember that even if an operation started out on cache, we might  •(((00530  53
*   need to deallocate a range or cylinder. A write could cause a  •(((00540  54
*   return to DASD and then once on DASD encounter head seeks etc.  •(((00550  55
*                                                                •(((00560     56
*   Care must be taken to insure that all required deallocation  •(((00570     57
*   actions are taken. For example, A 'Cache Read Error' should not  •(((00580  58
*   prevent the deallocation of a cylinder if 'Write Occurred' and  •(((00590  59
*   'Head Switch' are on.                                        •(((00600     60
*                                                                •(((00610     61
*   No special deallocation action is needed for the 'Channel    •(((00620     62
*   Interface Reset' flag. The other flags in the End Channel Program  •(((00630  63
*   Message will correctly specify any required deallocation.    •(((00640     64
*                                                                •(((00650     65
*   INTERNAL ITEMS   NAME        DESCRIPTION/PARAMETERS          •(((00660     66
*   -------- -----   ----        --------------------            •(((00670     67
*   ENTRY POINT(S):  MDFGDDS1    ENTRY PARAMETERS -- PASS LINK 2 •(((00680     68
*                                DID              -- PL2DID      •(((00690     69
*                                C                -- PL2CYLH     •(((00700     70
*                                C                -- PL2CYLL     •(((00710     71
*                                HEAD             -- PL2HEAD     •(((00720     72
*   NORMAL EXIT(S):  caller      none                            •(((00730     73
*   ERROR EXIT(S):   none                                        •(((00740     74
*   ROUTINES USED:   MDFGDSA5    PERMANENTLY DEALLOCATE FRAME    •(((00750     75
*                    MDFGDSA7    DEALLOCATE FRAME                •(((00760     76
*                    MDFGDSA8    DEALLOCATE RANGE                •(((00770     77
*                    MDFGDSB2    GET LAST SEEK                   •(((00780     78
*   MACROS USED:     UHALT       HALT MACRO                      •(((00790     79
*                    USETIRG     CHANGE THE IRG                  •(((00800     80
*                    UCALLMOD    CALL A MODULE                   •(((00810     81
*                    USAVE       SAVE THE IRG                    •(((00820     82
*                    URESTORE    RESTORE THE IRG                 •(((00830     83
*                    URETURN     RETURN TO CALLER                •(((00840     84
*   DATA STRUCTURES: MDDGDT02    R       DEVICE TYPE DESCRIPTOR  •(((00850     85
*   INTERNAL REGS:   >           >(R/W)  >                       •(((00860     86
*   EXTERNAL REGS:   IRG         R/W     REGISTER GROUP POINTER  •(((00870     87
*                                                                •(((00880     88
*   ENTRY IRG:       P(EX STK)   EXIT IRG:   P(EX STK)           •(((00890     89
*                    S(PL2)                   S(RTN)             •(((00900     90
*                                                                •(((00910     91
*   CHANGE ACTIVITY                                              •(((00920     92
*   ------ --------                                              •(((00930     93
*   03/08/82  RLC    START                                       •(((00940     94
*   03/17/82         D1 SCHEDULED (prolog)                       •(((00950     95
*   03/17/82         D1 COMPLETED                                •(((00960     96
*   03/17/82         I1 SCHEDULED (pseudo code)                  •(((00970     97
*   03/17/82         I1 COMPLETED                                •(((00980     98
*   03/30/82         I2 SCHEDULED (real code)                    •(((00990     99
```

```
* 04/14/82  RLC   CODE COMPLETE                                    *(((01000    100
* MM/DD/YY        I2 COMPLETED (MODULE SIZE = ??? words)           *(((01010    101
* >(m/d/y) >(by) >(change #) >(change description)                 *(((01020    102
                                                                   *(((01030    103
*****************  END OF SPECIFICATIONS  ************************ *(((01040    104
                                                                   *(((01060    106
                    * LOCALS                                        *(((01070    107
                                                                   *(((01080    108
                    ACCCOUNT  DEF    P0          *ACCESS COUNT       (((01090    109
                    LOCFLAGS  DEF    P1          *LOCAL FLAGBYTE     (((01100    110
                    DEALLOC   DEF    0           *DEALLOC FLAG       (((01110    111
                    SETDEALL  DEF    X80         *SET FLAG           (((01120    112
                    RESDEALL  DEF    X7F         *RESET FLAG         (((01130    113
                    ADDRESS   DEF    P2P3                            (((01140    114
                    ADDRESSH  DEF    P2                              (((01150    115
                    ADDRESSL  DEF    P3                              (((01160    116
                    XXERRDOM  DEF    P4P5        *ERROR DOMAIN ADDRESS(((01170   117
                    ERRDOMAN  DEF    P5                              (((01180    118
                    ERRADDR   DEF    P4P5        *ERROR ADDRESS      (((01190    119
                    XXTRKCYL  DEF    P4P5        *TRACKS PER CYLINDER(((01200    120
                    TRKCYL    DEF    P5                              (((01210    121
                    OLDHEAD   DEF    P5                              (((01220    122
                    FLAGS     DEF    P6P7        *FLAG BYTES         (((01230    123
                    FLAG0     DEF    P6          *FLAG BYTE 0        (((01240    124
                    DASDRERR  DEF    0             *DASD READ ERROR  (((01250    125
                    CACHRERR  DEF    2             *CACHE READ ERROR (((01260    126
                    IMBCYLSK  DEF    3             *IMBEDDED CYLINDER SEEK(((01270 127
                    TRSWITCH  DEF    4             *TRACK SWITCH     (((01280    128
                    WRITEOCC  DEF    5             *WRITE OCCURRED   (((01290    129
                    IMBHDSK   DEF    6             *IMBEDDED HEAD SEEK(((01300   130
                    CHANLRES  DEF    7             *CHANNEL INTERFACE RESET(((01310 131
                    FLAG1     DEF    P7          *FLAG BYTE 1        (((01320    132
                    FIRSTREC  DEF    0             *FIRST RECORD READ(((01330    133
                    LASTREC   DEF    1             *LAST RECORD READ (((01340    134
                    EOFREC    DEF    2             *EOF RECORD READ  (((01350    135
                    UPSKONLY  DEF    3             *UPDATE SEEK ONLY (((01360    136
                    DASDOPER  DEF    4             *DASD OPERATION   (((01370    137
                                                                    (((01380    138
                                                                    (((01390    139
                    * ENTRY Deallocation For Data Integrity         *(((01400    140
                                                                   *(((01410    141
                        ORG    MDFGDDS1                              (((01420    142
                        START  MDFGDDS1                              (((01430    143
                    MDFGDDS1 USAVE               *SAVE THE IRG       (((01440    144
OC80  2DF3        + MDFGDDS1  P3 = IRG           *SAVE IRG IN P3     (((00520
OC81  27F1        +           IRG = IRG + X10   *INCREMENT PRIMARY GROUP(((00530
OC82  AA20                    ADDRESSH = $RCVBUF *POINT TO RECEIVE BUFFER(((01450 145
OC83  8A30                    ADDRESSL = :RCV_FLAG *POINT TO FLAG BYTES(((01460  146
OC84  4A26                    FLAGS < (ADDRESS) *GET FLAG BYTES      (((01470    147
                                                                    (((01480    148
                                                                    (((01490    149
                    * IF 'cache read error' flag on                 *(((01500    150
                    *  THEN-DO for cache read error                 *(((01510    151
                    *    CALL Permanently Deallocate Frame          *(((01520    152
                    *      PASS: DID.C.C.H, error address           *(((01530    153
                    *      RECEIVE: Return Flag                     *(((01540    154
                    *    IF frame not found return flag             *(((01550    155
                    *      THEN HALT 60 - cache read error on frame not found*(((01560 156
                    *  END-THEN for cache read error                *(((01570    157
                                                                   *(((01580    158
OC85  5562                    JH   FLAG0,CACHRERR,LABEL *BRANCH IF CACHE READ ERROR(((01590 159
OC86  OC9E                    B    WHEN2          *JL WON'T REACH   (((01600    160
OC87  AA20        LABEL       ADDRESSH = $RCVBUF  *SET UP ADDRESS OF ERROR DOMAIN(((01610 161
OC88  8A33                    ADDRESSL = :RCV_ERRD                  (((01620    162
OC89  4A24                    XXERRDOM < (ADDRESS) *GET ERROR DOMAIN (((01630    163
OC8A  7A5E                    PL2ERRDM = ERRDOMAN  *PASS ERROR DOMAIN(((01640    164
OC8B  8A34                    ADDRESSL = :RCV_ERRA *SET UP ADDRESS OF ERROR ADDR(((01650 165
OC8C  4A24                    ERRADDR < (ADDRESS)  *GET ERROR ADDRESS(((01660    166
OC8D  4E5C                    PL2ERRAA = ERRADDR   *PASS ERROR ADDRESS(((01670   167
                                                   *DID.C.C.H IS ALREADY IN PL2(((01680 168
                                                   *PERM DEALLOC FRAME (((01690  169
                              UCALLMOD MDFGDSA5
OC8E  6FE0        +           DC    CALLMOD       *BAL INSTR TO CALL ROUTINE(((00500
OC8F  1540        +           DA    MDFGDSA5      *ADDRESS OF CALLED MODULE(((00510
OC90  5182                    JH    RETFLAG,NOTFOUND,HALT1 *BRANCH IF FRAME NOT FOUND(((01700 170
OC91  OC9E                    B     WHEN2                            (((01710    171
                                                 *CACHE RD ERROR FRAME NOT FOUND(((01720 172
                              HALT1 UHALT HALT_X60
OC92  1D13        + HALT1     JH    MIC.BTRCBIT,TLAB0003 *BRANCH IF TRACE NOT ON(((00550
OC93  6FE4        +           DC    TRACEMOD      *BAL TO TRACE MODULE
OC94  FF60        +           DB    XFF,X60       *TRACE X60
OC95  BA00        + TLAB0003  P0    = X00         *CLEAR HIGH ORDER BYTE(((00550
OC96  BA10        +           P1    = X60         *GET HALT X60      (((00560
OC97  BB20        +           P2    = $CCT_TABL   *SET UP ADDRESS TO CCT(((00570
OC98  4004        +           POP1  > (P2 :CCT_HERR) *STORE HALT ID IN CCT(((00580
OC99  23D2        +           XBP   = XBP / SWBANK1 *SWITCH TO BANK 1
OC9A  2311        +           MDR   = MDR / X10    *INHIBIT DESELECTION RESET
OC9B  21D0        +           XBP   = XBP , SWBANK0 *SWITCH TO BANK 0
OC9C  23C4        +           ILR   = ILR / ILR_SET1 *CAUSE LEVEL 1 INTERRUPT
                                                    *HANG           (((00590
OC9D  OC9D        +           B     LOOP                             (((01730    173
                                                                    (((01740    174
                                                                   *(((01750    175
                    * IF 'Write Occurred' flag on                   *(((01760    176
                    *  THEN-DO for write occurred                   *(((01770    177
                    *    SELECT on flags                            *(((01780    178
                                                                    (((01790    179
OC9E  5B62        WHEN2       JH   FLAG0,WRITEOCC,SELECT2 *BRANCH IF WRITE OCCURRED(((01800 180
OC9F  OCD2                    B    DONE           *BRANCH TO DONE   (((01810    181
                                                                    (((01820    182
                                                                   *(((01830    183
                    *    DO-WHEN imbedded head seek                 *(((01840    184
                    *      Get tracks/cyl for this device type (DTD)*(((01850    185
                    *      CALL Deallocate Range                    *(((01860    186
                    *        PASS: DID.C.C.O, tracks/cyl (deallocate cylinder)*(((01870 187
                    *        RECEIVE: Return flag byte              *(((01880    188
                    *    END-WHEN imbedded head seek                *(((01890    189
```

```
OCAO  5D62        SELECT2  JH     FLAG0,IMBHDSK,LABEL2    *BRANCH IF HEAD SEEK        (((01900    190
OCA1  OCB2                 B      WHEN22                  *JL WON'T REACH             (((01910    191
                  LABEL2   USETIRG IRG_SECD SST_SECD      *SWITCH TO SST              (((01920    192
OCA2  31F0      + LABEL2   IRG    = IRG . XF0                *Clear appropriate nibble (((00660
OCA3  33F5      +          IRG    = IRG / X05                *Set appropriate nibble   (((00670
OCA4  BB20               ADDRESSH = $DTD_TABL              *SET UP ADDRESS OF DTD      (((01930    193
OCA5  51F4                 JH     SST_DFLG,BITDEVTA,TYPEA *JUMP IF TYPE A             (((01940    194
OCA6  CA37               ADDRESSL = :DFHDTRKB                                          (((01950    195
OCA7  4A24               XXTRKCYL < (ADDRESS)             *GET TRACKS/CYLINDER B       (((01960    196
OCA8  OCAB                 B      CALLIT                                               (((01970    197
OCA9  CA30      TYPEA    ADDRESSL = :DFHDTRKA                                          (((01980    198
OCAA  4A24               XXTRKCYL < (ADDRESS)             *GET TRACKS/CYLINDER A       (((01990    199
                  CALLIT   USETIRG IRG_SECD PL2_SECD      *SWITCH TO PL2              (((02000    200
OCAB  31F0      + CALLIT   IRG    = IRG . XF0                *Clear appropriate nibble (((00660
OCAC  33F2      +          IRG    = IRG / X02                *Set appropriate nibble   (((00670
OCAD  BAB0                PL2HEAD = X00                   *LOWER LIMIT = 0            (((02010    201
OCAE  7A5C                PL2HEAD2 = TRKCYL               *UPPER LIMIT = TRACKS/CYL   (((02020    202
                         UCALLMOD MDFGDSA8                *DEALLOCATE RANGE           (((02030    203
OCAF  6FE0      +          DC     CALLMOD                    *BAL INSTR TO CALL ROUTINE (((00500
OCB0  1600      +          DA     MDFGDSA8                   *ADDRESS OF CALLED MODULE  (((00510
OCB1  OCD2                 B      DONE
                                                                                       (((02040    204
                                                                                       (((02050    205
                  *----------------------------------------------------------------*(((02060    206
                  *         DO-WHEN track switch                                    *(((02070    207
                  *            CALL Get Last Seek                                   *(((02080    208
                  *               PASS: DID                                         *(((02090    209
                  *               RECEIVE: DID.C.C.H (old)                          *(((02100    210
                  *            CALL Deallocate range                                *(((02110    211
                  *               PASS: DID.C.C.H (old), H (new)                    *(((02120    212
                  *               RECEIVE: Return flag byte                         *(((02130    213
                  *         END-WHEN track switch                                   *(((02140    214
                  *----------------------------------------------------------------*(((02150    215
                  WHEN22   USETIRG IRG_SECD PL2_SECD      *SWITCH TO PL2             (((02160    216
OCB2  31F0      + WHEN22   IRG    = IRG . XF0                *Clear appropriate nibble (((00660
OCB3  33F2      +          IRG    = IRG / X02                *Set appropriate nibble   (((00670
OCB4  586B                 JL     FLAG0,TRSWITCH,WHEN23   *BRANCH IF NO TRACK SWITCH (((02170    217
                         UCALLMOD MDFGDSB2                *GET LAST SEEK             (((02180    218
OCB5  6FE0      +          DC     CALLMOD                    *BAL INSTR TO CALL ROUTINE (((00500
OCB6  1720      +          DA     MDFGDSB2                   *ADDRESS OF CALLED MODULE  (((00510
OCB7  7AD5                OLDHEAD = RTN_HEAD              *MAKE COPY OF OLD HEAD     (((02190    219
                  USETIRG IRG_SECD PL2_SECD               *SWITCH TO PL2             (((02200    220
OCB8  31F0      +          IRG    = IRG . XF0                *Clear appropriate nibble (((00660
OCB9  33F2      +          IRG    = IRG / X02                *Set appropriate nibble   (((00670
OCBA  7ABC               PL2HEAD2 = PL2HEAD               *UPPER LIMIT IS CURRENT HEAD (((02210   221
OCBB  7A5B               PL2HEAD = OLDHEAD                *LOWER LIMIT IS OLD HEAD    (((02220    222
                         UCALLMOD MDFGDSA8                *DEALLOCATE RANGE           (((02230    223
OCBC  6FE0      +          DC     CALLMOD                    *BAL INSTR TO CALL ROUTINE (((00500
OCBD  1600      +          DA     MDFGDSA8                   *ADDRESS OF CALLED MODULE  (((00510
OCBE  OCD2                 B      DONE                    *(IGNORE RETURN FLAG)       (((02240    224
                                                                                       (((02250    225
                  *----------------------------------------------------------------*(((02260    226
                  *         DO-WHEN not dasd operation                              *(((02270    227
                  *            CALL Deallocate Frame                                *(((02280    228
                  *               PASS: DID.C.C.H                                   *(((02290    229
                  *               RECEIVE: Return flags                             *(((02300    230
                  *            IF 'not found' return flag set                       *(((02310    231
                  *               THEN HALT 61 - deallocation for frame not found   *(((02320    232
                  *         END-WHEN not dasd operation                             *(((02330    233
                  *            OTHERWISE NULL                                       *(((02340    234
                  *         END-SELECT on flags                                     *(((02350    235
                  *      END-WHEN write occurred                                    *(((02360    236
                  *----------------------------------------------------------------*(((02370    237
OCBF  5872        WHEN23   JL     FLAG1,DASDOPER,CACHEOK  *BRANCH IF NOT ON DASD     (((02380    238
OCC0  OCD2                 B      DONE                                                             239
                  CACHEOK  USETIRG IRG_SECD PL2_SECD      *SWITCH TO PL2             (((02390    240
OCC1  31F0      + CACHEOK  IRG    = IRG . XF0                *Clear appropriate nibble (((00660
OCC2  33F2      +          IRG    = IRG / X02                *Set appropriate nibble   (((00670
                         UCALLMOD MDFGDSA7                *DEALLOC FRAME             (((02400    241
OCC3  6FE0      +          DC     CALLMOD                    *BAL INSTR TO CALL ROUTINE (((00500
OCC4  1590      +          DA     MDFGDSA7                   *ADDRESS OF CALLED MODULE  (((00510
OCC5  508D                 JL     RETFLAG,NOTFOUND,DONE   *BRANCH IF FOUND           (((02410    242
                         UHALT HALT_X61                   *DEALLOCATION ON FRAME NOT FND (((02420 243
OCC6  1D13      +          JH     MIC,BTRCBIT,TLABOOOD       *BRANCH IF TRACE NOT ON    (((00550
OCC7  6FE4      +          DC     TRACEMOD                   *BAL TO TRACE MODULE
OCC8  FF61      +          DB     XFF,X61                    *TRACE X61
OCC9  8A00      + TLABOOOD P0     = X00                      *CLEAR HIGH ORDER BYTE     (((00550
OCCA  BA11      +          P1     = X61                      *GET HALT X61              (((00560
OCCB  BB20      +          P2     = $CCT_TABL                *SET UP ADDRESS TO CCT     (((00570
OCCC  4004      +          POP1   > (P2..:CCT_HERR)          *STORE HALT ID IN CCT      (((00580
OCCD  23D2      +          XBP    = XBP / SWBANK1            *SWITCH TO BANK 1
OCCE  2311      +          MDR    = MDR / X10                *INHIBIT DESELECTION RESET
OCCF  21DD      +          XBP    = XBP . SWBANK0            *SWITCH TO BANK 0
OCD0  23C4      +          ILR    = ILR / ILR_SET1           *CAUSE LEVEL 1 INTERRUPT
OCD1  OCD1      +          B      LOOP                       *HANG                      (((00590
                                                                                       (((02430    244
                  *----------------------------------------------------------------*(((02440    245
                  *  Return                                                        *(((02450    246
                  *----------------------------------------------------------------*(((02460    247
                  DONE     URESTORE                        *RESTORE THE IRG           (((02470    248
OCD2  31F0      + DONE     IRG    = IRG . XF0                *ZERO SECONDRY REGISTER GRP (((00510
OCD3  37F4      +          IRG    = IRG + X04                *SET SECONDARY TO 4        (((00520
OCD4  27FF      +          IRG    = IRG + XF0                *AND DECREMENT PRIMARY     (((00530
                         URETURN                          *RETURN TO CALLER           (((02480    249
OCD5  4C54      +          BALR   P4P5, P4P5                 *RETURN TO CALLER          (((00480
OCD6                       END                                                         (((02490    250
                                ** LABEL TABLE WITH REFERENCES **

EQUATE
         LABEL    ADDR    VALUE                  REFERENCE ADDRESSES

ADDRESS          P2P3          OC84 OC89 OCBC OCA7 OCAA
         ADDRESSH         P2            OC82 OC87 OCA4
         ADDRESSL         P3            OC83 OC88 OC8B OCA6 OCA9
         BITDEVTA         0             OCA5
         BTRCBIT          6             OC92 OCC6
         CACHEOK  OCC1                  OCBF
```

| LABEL | ADDR | EQUATE VALUE | REFERENCE ADDRESSES |
|---|---|---|---|
| CACHRERR | | 2 | OC85 |
| CALLIT | OCAB | | OCA8 |
| CALLMOD | | X6FE0 | OC8E OCAF OCB5 OCBC OCC3 |
| CCT_HERR | | X7004 | OC98 OCCC |
| CCT_TABL | | X7000 | OC97 OCCB |
| DASDOPER | | 4 | OCBF |
| DFHDTRKA | | X7080 | OCA9 |
| DFHDTRKB | | X7087 | OCA6 |
| DONE | OCD2 | | OC9F OCB1 OCBE OCC0 OCC5 |
| DTD_TABL | | X7080 | OCA4 |
| ERRADDR | | P4P5 | OC8C OC8D |
| ERRDOMAN | | P5 | OC8A |
| FLAGS | | P6P7 | OC84 |
| FLAG0 | | P6 | OC85 OC9E OCA0 OCB4 |
| FLAG1 | | P7 | OCBF |
| HALT_X60 | | X60 | OC92 |
| HALT_X61 | | X61 | OCC6 |
| HALT1 | OC92 | | OC90 |
| ILR | | E28 | OC9C OC9C OCD0 OCD0 |
| ILR_SET1 | | X40 | OC9C OCD0 |
| IMBHDSK | | 6 | OCA0 |
| IRG | | E31 | OC80 OC81 OC81 OCA2 OCA2 OCA3 OCA3 OCAB OCAB OCAC OCAC OCB2 OCB2 OCB3 OCB3 OCB8 OCB8 OCB9 OCB9 OCC1 OCC1 OCC2 OCC2 OCD2 OCD2 OCD3 OCD3 OCD4 OCD4 |
| IRG_SECD | | XF0 | OCA2 OCAB OCB2 OCB8 OCC1 |
| LABEL | OC87 | | OC85 |
| LABEL2 | OCA2 | | OCA0 |
| MDFGDDS1 | | X0C80 | OC80 OC80 |
| MDFGDSA5 | | X1540 | OC8F |
| MDFGDSA7 | | X1590 | OCC4 |
| MDFGDSA8 | | X1600 | OCB0 OCBD |
| MDFGDSB2 | | X1720 | OCB6 |
| MDR | | E17 | OC9A OC9A OCCE OCCE |
| MIC | | E17 | OC92 OCC6 |
| NOTFOUND | | 0 | OC90 OCC5 |
| OLDHEAD | | P5 | OCB7 OCBB |
| PL2_SECD | | X02 | OCAB OCB2 OCB8 OCC1 |
| PL2ERRAA | | S4S5 | OC8D |
| PL2ERRDM | | S6 | OC8A |
| PL2HEAD | | S3 | OCAD OCBA OCBB |
| PL2HEAD2 | | S4 | OCAE OCBA |
| RCV_ERRA | | X4004 | OC8B |
| RCV_ERRD | | X4003 | OC8B |

| LABEL | ADDR | EQUATE VALUE | REFERENCE ADDRESSES |
|---|---|---|---|
| RCV_FLAG | | X4000 | OC83 |
| RCVBUF | | X4000 | OC82 OC87 |
| RETFLAG | | S0 | OC90 OCC5 |
| RTN_HEAD | | S5 | OCB7 |
| SELECT2 | OCA0 | | OC9E |
| SST_DFLG | | S7 | OCA5 |
| SST_SECD | | X05 | OCA2 |
| SWBANK0 | | XDF | OC9B OCCF |
| SWBANK1 | | X20 | OC99 OCCD |
| TLAB000D | OCC9 | | OCC6 |
| TLAB0003 | OC95 | | OC92 |
| TRACEMOD | | X6FE4 | OC93 OCC7 |
| TRKCYL | | P5 | OCAE |
| TRSWITCH | | 4 | OCB4 |
| TYPEA | OCA9 | | OCA5 |
| WHEN2 | OC9E | | OCB6 OC91 |
| WHEN22 | OCB2 | | OCA1 |
| WHEN23 | OCBF | | OCB4 |
| WRITEOCC | | 5 | OC9E |
| XBP | | E29 | OC99 OC99 OC9B OC9B OCCD OCCD OCCF OCCF |
| XXERRDOM | | P4P5 | OC89 |
| XXTRKCYL | | P4P5 | OCA7 OCAA |

We claim:

1. Method for improving efficiency of a data processing system of the type comprising a host computer connected via channel means to long-term data storage means, said host being adapted to issue commands calling for specific data records stored on said long-term data storage means, said commands not including explicit indication of sequentiality of requets, comprising the steps of:

examining such individual host originated command seeking a particular data record to determine whether the data thus called for is stored in solid-state memory means external to said channel, and if said data is stored in said solid-state memory means, transmitting said data to said host;

if said data is not stored in said solid-state memory means, accessing said data on said long-term data storage means and passing it over said channel means to said host, and examining the commands by which a given record is passed from said long-term data storage means to said host in order to determine whether said record is one of a sequence of such records; and if said determination indicates that said record is one of such a sequence, reading the next record in said sequence from said long-term storage means into said solid-state memory means in anticipation of its being called for by said host;

wherein the indication that a given record is one of a sequence is derived by examination of said commands for indicators signaling that said data is not part of such a sequence, in response to absence of such indicators.

2. The method of claim 1 wherein said data is stored on magnetic disk drive means, said disks being organized into tracks, said indicators signaling that a given record is not part of a sequence of such records comprising commands instructing that records not on the same track of the same disk be supplied to said host.

3. The method of claim 1 wherein said records are stored on long-term storage means, said long-term storage means comprising disk drive means adapted to store data organized into tracks, and said data being read from said long-term storage means into said solid-state memory means track by track.

4. In a method of control of storage of digital data on storage means comprising long-term magnetic storage means and faster access solid-state memory means, said solid-state memory means adapted to contain data records stored on said long-term storage means upon indication that said data records are anticipated to be called for by a host computer means, the improvement comprising deriving said indication from examination of the commands by which data previously called for by said host computer means was accessed, said commands not including any explicit indication of sequentiality of requests, and storing said records in said solid-state memory means in response to said derived indication.

5. The method of claim 4 wherein said examination comprises the determination whether the commands for reading said previously called for data included instructions to read other data not sequentially stored on said long-term storage means.

6. A data processing system comprising a host computer and a data storage subsystem, the host computer adapted to be connected to the data storage subsystem by a channel, the data storage subsystem comprising:
  a director for connection to said channel;
  a control module for connection to said director; and
  disk drive means for connection to said control module;
  said channel being adapted to pass signals to said director for control of said data storage subsystem, said signals not including a signal indicative of whether a particular data access request made by said host is one of a sequence of such requests directed at a single portion of a single one of said disks;
  said data storage subsystem further comprising:
    a solid-state cache memory means for storage of data, said cache memory means being connected to said director by a data pathway over which said cache can receive data from said disk drive means and can output data through said director to said channel for transmission to said host; and
    a cache manager means for controlling the operation of said cache memory means, said cache manager comprising means for examining the sequence of signals passed by said host over said channel to said director in performance of a data access operation, means for determining from said signals whether or not a particular data access request is likely to be one of a series of such data access requests directed at a single area on one of said disks, and means for causing data not called for by said host to be copied from said disk through said director into said solid-state cache for storage in response to the determination that a particular data access request appears to be one of a sequence of such requests directed at a single area on a disk.

7. Method of control of data flow between a host computer of a class generating a predetermined series of data flow commands to a long-term memory subsystem for accessing data stored therein, said series of data flow commands not including any explicit indication of whether a particular data request is one of a sequence of said requests, said subsystem comprising disk drive menas, control module means, storage director means, solid-state cache memory means, and cache manager means connected to one another for flow of data and controls signals between one another, comprising the steps of:
  responding to the series of commands output by said host,
  examining each said series of commands to determine if any one data request is possibly one of a series of such requests, and if said determination indicates that the request may be one of a series of requests, subsequently determining whether the request is the latest in a seris of such request,
  staging a first amount of data not called for by said host from said disk drive means to said cache memory means in response to each data request regardless of the outcome of said determinations; and
  staging a second relatively larger amount of data from said disk drive means to said cache memory means if said subsequent determination indicates that a given request appears likely to be one of a series of such requests.

8. The method of claim 7 wherein said first amount of data is at most one disk track and said second amount of data is at least one disk track.

9. A method for control of a cache memory subsystem adapted to be connected to a host computer, said subsystem comprising:
  solid-state cache storage means and cache manager means, said cache manager being adapted to examine signals passed between a host computer and a storage director, and to output cache control signals to control the flow of data from magnetic data storage means through said director into said cache storage means and from said cache storage means through said director to said host, comprising the steps of:
  examining control signals output by said host during the satisfaction of a host read request for indication whether or not said request is likely to be one of a sequence of such requests, and if so, controlling flow of additional data not called for by said host into said cache storage means, in anticipation of requests for such additional data by said host.

10. The method of claim 9 wherein said cache manager controls flow of data from data files of differing classes, wherein a first group of data files are longer records than are typically accessed by a host computer in a single access operation, and a second group of data files are records of sizes typically accessed in their entirety.

11. The method of claim 10 wherein differing amounts of additional data are staged to said cache storage means in dependence on the class of disk file accessed.

* * * * *

UNITED STATES PATENT AND TRADEMARK OFFICE
CERTIFICATE OF CORRECTION

PATENT NO. : 4,536,836
DATED : August 20, 1985
INVENTOR(S) : P. David Dodd et al It is certified that error appears in the above-identified patent and that said Letters Patent is hereby corrected as shown below:

Col. 1, line 24, "presenting" should be --presently--.

Col. 2, line 30, "single" should be --signal--;

line 63, "rendeted" should be -rendered--.

Col. 3, line 62, "cachhe" should be --cache--.

Col. 4, line 20, "shown" should be --shows--.

Col. 5, line 27 "similar" should be --similarly--;

line 56, "cahce" should be --cache--.

Col. 6, line 8, "disquality" should be --disqualify--.

Col. 8, line 36 "undergoen" should be --undergone--.

Signed and Sealed this

Seventeenth Day of December 1985

[SEAL]

Attest:

DONALD J. QUIGG

Attesting Officer     Commissioner of Patents and Trademarks